(12) United States Patent
Fujita et al.

(10) Patent No.: US 7,416,256 B2
(45) Date of Patent: Aug. 26, 2008

(54) BASE NET SUPPORTING MECHANISM FOR SEAT AND SEAT STRUCTURE THEREOF

(75) Inventors: Etsunori Fujita, Hiroshima (JP); Seiji Kawasaki, Hiroshima (JP); Yasuhide Takata, Hiroshima (JP)

(73) Assignee: Delta Tooling Co., Ltd., Hiroshima-Shi, Hiroshima (JP)

( * ) Notice: Subject to any disclaimer, the term of this patent is extended or adjusted under 35 U.S.C. 154(b) by 63 days.

(21) Appl. No.: 11/382,609

(22) Filed: May 10, 2006

(65) Prior Publication Data

US 2006/0279120 A1 Dec. 14, 2006

(30) Foreign Application Priority Data

Jun. 13, 2005 (JP) ............... 2005-173046

(51) Int. Cl.
*A47C 7/02* (2006.01)
*A47C 7/14* (2006.01)

(52) U.S. Cl. ............... 297/452.56; 297/284.2; 297/284.11; 297/216.1

(58) Field of Classification Search ........... 297/452.56, 297/337, 216.1, 284.2, 284.11
See application file for complete search history.

(56) References Cited

U.S. PATENT DOCUMENTS

| | | | | |
|---|---|---|---|---|
| 3,273,877 A | * | 9/1966 | Geller et al. .................. 267/89 |
| 4,615,563 A | * | 10/1986 | Kobayashi ............... 297/284.6 |
| 4,915,447 A | * | 4/1990 | Shovar .................. 297/284.11 |
| 5,601,338 A | * | 2/1997 | Wahls ........................ 297/313 |
| 6,419,317 B1 | * | 7/2002 | Westrich et al. ........ 297/284.11 |
| 6,460,819 B1 | * | 10/2002 | Muhlberger et al. ........ 248/421 |
| 6,644,752 B2 | * | 11/2003 | Takata .................... 297/452.56 |
| 6,851,755 B2 | * | 2/2005 | Dinkel et al. ........... 297/452.48 |
| 2002/0113473 A1 | * | 8/2002 | Knaus .................... 297/284.11 |
| 2003/0193231 A1 | * | 10/2003 | Fujita et al. ............. 297/452.56 |
| 2004/0178667 A1 | * | 9/2004 | Fujita et al. ............... 297/216.1 |

FOREIGN PATENT DOCUMENTS

| | | |
|---|---|---|
| JP | 2003-182427 | 7/2003 |
| JP | 2004-141545 | 5/2004 |
| JP | 2004-188164 | 7/2004 |
| JP | 2004-347577 | 12/2004 |
| WO | 2004/007238 A1 | 1/2004 |

* cited by examiner

*Primary Examiner*—Sarah B McPartlin
(74) *Attorney, Agent, or Firm*—Wolf, Block, Schorr & Solis-Cohen LLP

(57) ABSTRACT

In order to improve seating comfort and vibration absorbency, a structure including a first torsion bar unit 70 disposed in the rear of a seat cushion, and a second torsion bar unit 80 disposed in the front of the seat cushion, and a base net 60 stretched between a rear supporting frame 74 of the first torsion bar unit 70 and a front supporting frame 84 of the second torsion bar unit 80, is provided. Owing to the elastic force of a front torsion bar 81 of the second torsion bar unit 80 positioned in the front of the seat, a sense of stroke at the time of seating is enhanced. Owing to the elastic force of a rear torsion bar 71 of the first torsion bar unit 70 positioned in the rear of the seat, similarly to the conventional structure, a load of a seated person can be sufficiently received and a stable seating comfort can be obtained. Since both the first torsion bar unit 70 and the second torsion bar unit 80 work together to dampen vibration inputted during driving, vibration absorbency is more enhanced than ever.

15 Claims, 22 Drawing Sheets

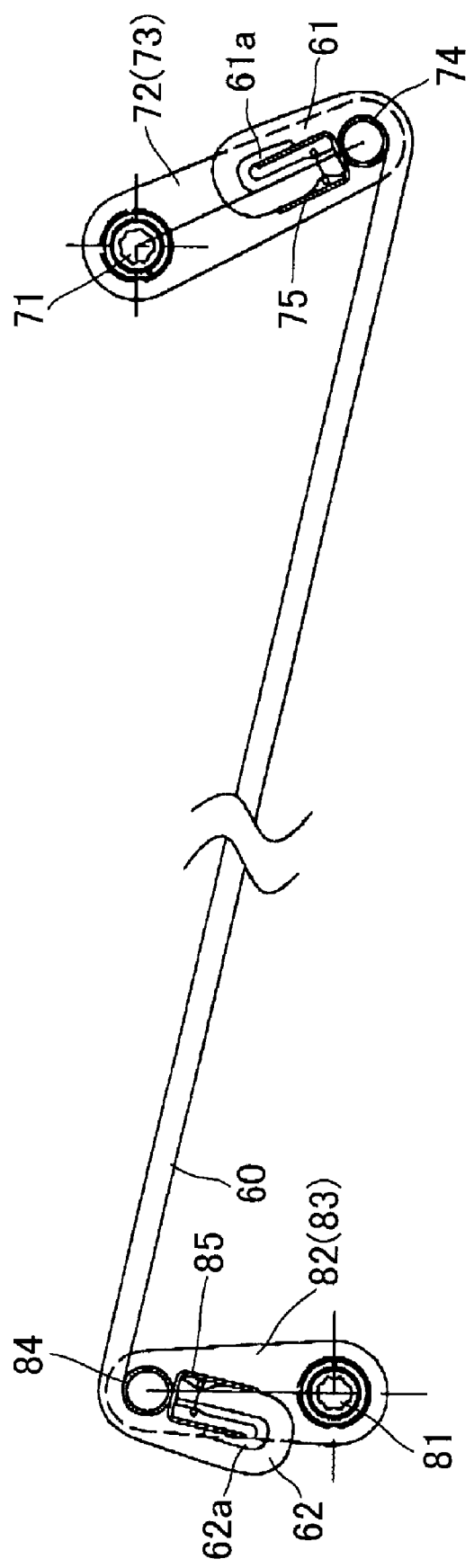

F I G. 7A
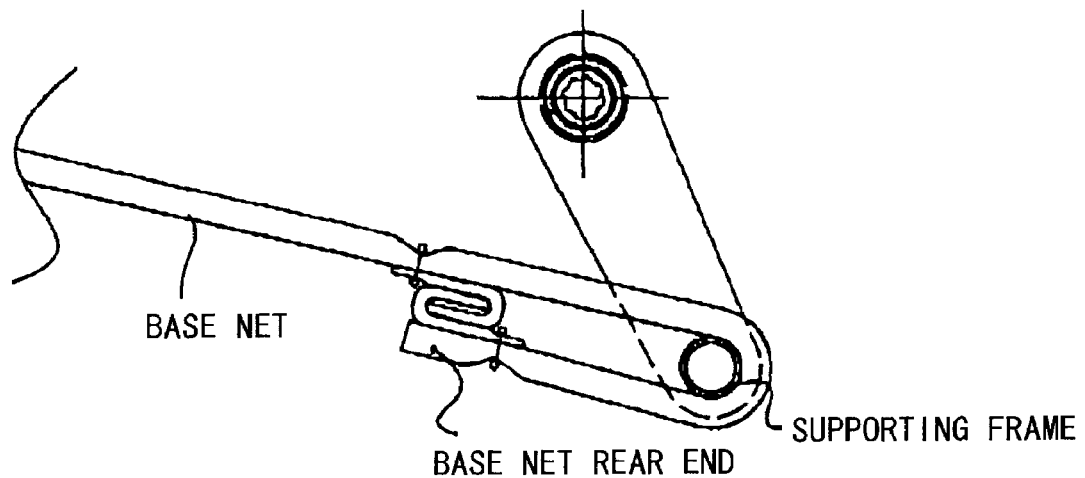
F I G. 7B
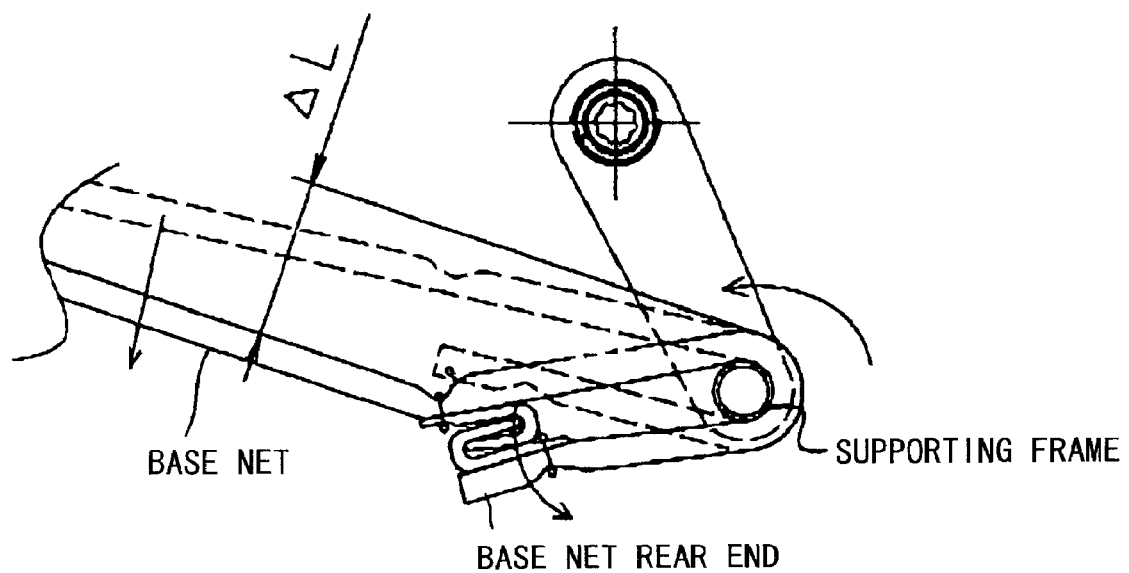

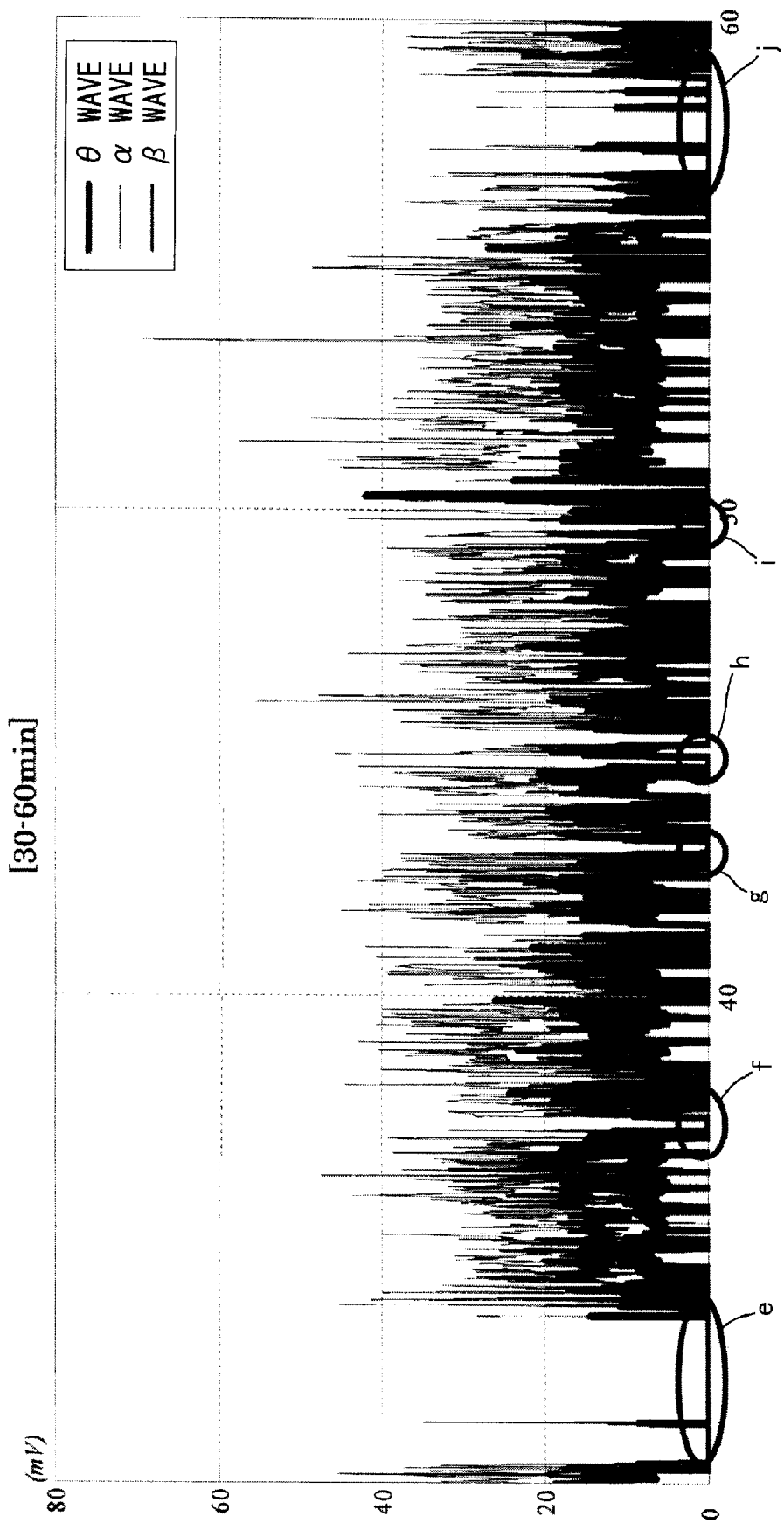

BASE NET SUPPORTING MECHANISM FOR SEAT AND SEAT STRUCTURE THEREOF

BACKGROUND OF THE INVENTION

1. Field of the Invention

The present invention relates to a base net supporting mechanism for a seat cushion used in a seat structure formed by stretching across a cushioning member over a seat frame and a seat structure containing the base net supporting mechanism for a seat cushion, and in particular relates to a base net supporting mechanism for a seat cushion suitable for a transportation machine such as a plane, a train, a ship, a forklift, a motor vehicle and so on and a seat structure containing the base net supporting mechanism for a seat cushion.

2. Description of the Related Art

A seat structure formed by stretching a cushioning member such as a solid knitted fabric (a three-dimensional net member) across a seat frame is disclosed in Patent Documents 1 to 5. When forming a cushioning member stretching across a seat frame in this manner, in order to enhance preventability of bottom-touch, vibration absorbency, impact absorbency, a base net made of cloth such as a solid knitted fabric, a two-dimensional cloth and the like is provided below the above-described cushioning member via an elastic member. In all of the Patent Documents 1 to 5, a torsion bar unit including a torsion bar, an arm connected to the torsion bar, and rotatably supported by the torsion bar as a fulcrum, and a supporting frame supported by the arm, is disposed in the rear of a seat, and the base net is elastically supported by connecting the rear end of the base net to the supporting frame. Note that the front end of the base net is fixed to a front frame composing the seat frame.

[Patent Document 1] Japanese Patent Application Laid-open 2004-347577

[Patent Document 2] Japanese Patent Application Laid-open 2003-182427

[Patent Document 3] Japanese Patent Application Laid-open 2004-188164

[Patent Document 4] Japanese Patent Application Laid-open 2004-141545

[Patent Document 5] International Patent Publication WO 2004/007238A1

In the technology disclosed in Patent Documents 1 to 5, by elastically supporting a base net with a torsion bar, it is possible to achieve improvement of vibration absorbency as described above without bringing a feeling of something foreign to users despite a fact that by using thinner material compared with urethane material generally used in a prior art as a cushioning member for a car seat or the like, a hip point (H. P.) is lowered by about 10 mm compared with using the urethane urethane. However, in all the technology described above, a torsion bar is disposed in the rear of the seat cushion, and the front end of the base net is fixed. In particular, a structure disposing arms and a supporting frame connected to a torsion bar on the rear tilting upper side is excellent in vibration absorbency, but gives a feeling of the buttocks or the pelvis being pushed from behind when seating due to pulling the rear end of the base net in a rearward and upward-tilting direction, or gives a sense of so-called seating on a hammock. Then, the sense of seating on a hammock is eliminated by taking a countermeasure such as lying urethane material under the buttocks, the urethane material having a thickness of about 20 mm and being enhanced in facial rigidity by impregnating felt into the urethane. Disposition of another urethane material in the front of the seat, and at the same time, disposition of an auxiliary net to prevent forward displacement of the buttocks under the base net are carried out, but it is also necessary to lay still another net or a plastic board or the like between the front urethane and the auxiliary net in order to ensure a supporting surface with no fluctuation in body pressure distribution (surface having a sense of continuous support) because a force to push up from rear by the torsion bar works. Moreover, since the front end is fixed, a force of the leg is received at the time of pedal operation, and the counter force thereof is perceived as a sense of hitting on the front end of the seat. Furthermore, since urethane material used at the front part of the seat has a feeling of springiness relatively hard, it sometimes lacks a sense of stroke.

SUMMARY OF THE INVENTION

The present invention is achieved in consideration of the above problems, and an object of the present invention is to provide a base net supporting mechanism for a seat cushion and a seat structure which is not only able to enhance a sense of stroke when seating, but also can further improve vibration absorbency while maintaining a hip point about 10 mm lower than that of a conventional seat structure so as to further improve a feeling of sitting on, seating comfort, and riding comfort, and can prevent a feeling of something foreign caused by combining different materials such as a solid knitted fabric and an urethane material.

In order to solve the above problems, the present invention provides a base net supporting mechanism for a seat cushion supporting a base net disposed under a cushioning member for a seat cushion provided by stretching across a seat frame, the base net supporting mechanism including:

a first torsion bar unit including a torsion bar, arms connecting to the torsion bar, and a supporting frame supported by the arms, and the arms being provided in the rear of the seat cushion pivotably in front and behind around the torsion bar acting as a fulcrum; and a second torsion bar unit including a torsion bar, arms connecting to the torsion bar, and a supporting frame supported by the arms, and said arms being provided at the front of the seat cushion pivotably in front and behind around the torsion bar acting as a fulcrum, in which the base net is stretched between the supporting frame of the first torsion bar unit and the supporting frame of the second torsion bar unit.

The invention provides a base net supporting mechanism for a seat cushion, in which the first torsion bar unit is provided so that the torsion bar acting as a fulcrum is positioned upper than the supporting frame supported via the arm.

The invention provides a base net supporting mechanism for a seat cushion, in which the second torsion bar unit is provided so that the torsion bar acting as a fulcrum is positioned lower than the supporting frame supported via the arm.

The invention provides a base net supporting mechanism for a seat cushion, in which an engaging bracket protruding upward is attached to the supporting frame of the first torsion bar unit, the rear end of the base net is passed through under the supporting frame and stretched around the supporting frame, and a portion to be engaged provided in the rear end is engaged with the engaging bracket.

The invention provides a base net supporting mechanism for a seat cushion, in which an engaging bracket protruding downward is attached to the supporting frame of the second torsion bar unit, the front end of the base net is passed through above the supporting frame and stretched around the supporting frame and a portion to be engaged provided at the front end is engaged with the engaging bracket.

The invention provides a base net supporting mechanism for a seat cushion, in which the pivoting range of the arm in the second torsion bar unit is set at an angle of 40° or less respectively in front and behind around the torsion bar with respect to an unloaded state.

The invention provides a seat structure having a cushioning member for a seat cushion provided by stretching it across a seat frame and a base net disposed under the cushioning member for a seat cushion, including a first torsion bar unit including a torsion bar, arms connecting to the torsion bar, and a supporting frame supported by the arms, and the arms being provided in the rear of the seat cushion pivotably in front and behind around the torsion bar acting as a fulcrum; and a second torsion bar unit including a torsion bar, arms connecting to the torsion bar, and a supporting frame supported by the arms, and said arms being provided at the front of the seat cushion pivotably in front and behind around said torsion bar acting as a fulcrum, in which the base net is stretched around the supporting frame of the first torsion bar unit and the supporting frame of the second torsion bar unit.

The invention provides a seat structure, in which the first torsion bar unit is provided so that the torsion bar acting as a fulcrum is positioned upper than the supporting frame supported via the arm.

The invention provides a seat structure, in which the first torsion bar unit is provided so that the torsion bar acting as a fulcrum is positioned upper than the supporting frame supported via the arm.

The invention provides a seat structure, in which an engaging bracket protruding upward is attached to the supporting frame of the first torsion bar unit, the rear end of the base net is passed through under the supporting frame and wound around the supporting frame and a portion to be engaged provided in the rear end is engaged with the engaging bracket.

The invention provides a seat structure, in which an engaging bracket protruding downward is attached to the supporting frame of the second torsion bar unit, the front end of the base net is passed through above the supporting frame and wound around the supporting frame, and a portion to be engaged provided in the front end is engaged with the engaging bracket.

The invention provides a seat structure, in which a pivoting range of the arm of the second torsion bar unit is set at an angle of 40° or less in front or behind around the torsion bar respectively with respect to an unloaded state.

The invention provides a seat structure, in which the side frames of the seat frame are elastically deformed when a load equal to or greater than a predetermined limit is placed rearward on the seat back during impact, the supporting frame of the first torsion bar unit relatively displaces in lower forward-tilting direction, the tension of the base net is lowered, and the damping ratio is increased.

The invention provides a seat structure, in which a stopper member controlling the pivoting range of the arm of the second torsion bar unit in a rearward-tilting direction is provided, and when the arm of the second torsion bar unit abuts on the stopper member after the tension of the base net is loosened during impact, the stopper member deforms or displaces moving the control position of the arm further rearward, to further lower the tension of the base net.

The invention provides a seat structure, further including an auxiliary elastic mechanism provided under the base net between the first torsion bar unit and the second torsion bar unit, to support a load together with the base net.

The invention provides a seat structure, in which the auxiliary elastic mechanism includes an auxiliary net disposed under the base net, and a coil spring elastically supporting the auxiliary net to the side frames of the seat frame.

The invention provides a seat structure, in which the auxiliary elastic mechanism is formed including an air cushion disposed under the base net and having a plurality of partitioned bulging portions.

BRIEF DESCRIPTION OF THE DRAWINGS

FIG. 5 is a view to explain a method of engaging a base net in the above-described embodiment;

FIGS. 7A and 7B are views showing an engaging method of a conventional base net;

FIG. 22 is a graph showing data taken from 30 minutes to 60 minutes after the start of measurement, which is a continuation of the graph in FIG. 21

DETAILED DESCRIPTION OF THE PREFERRED EMBODIMENT(S)

Figure 1:
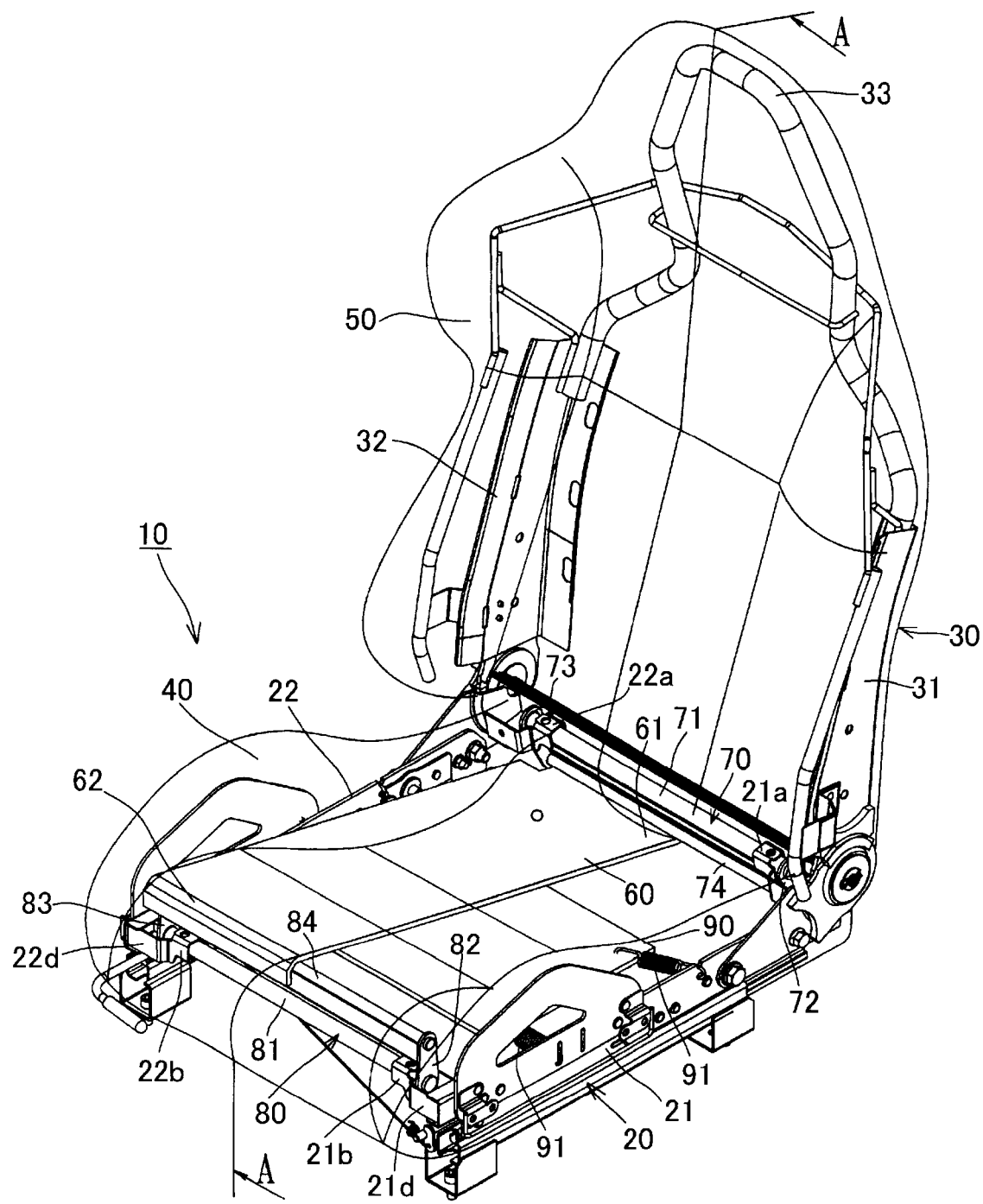
FIG. 1 is a view showing a seat structure according to an embodiment of the present invention.
Figure 2:
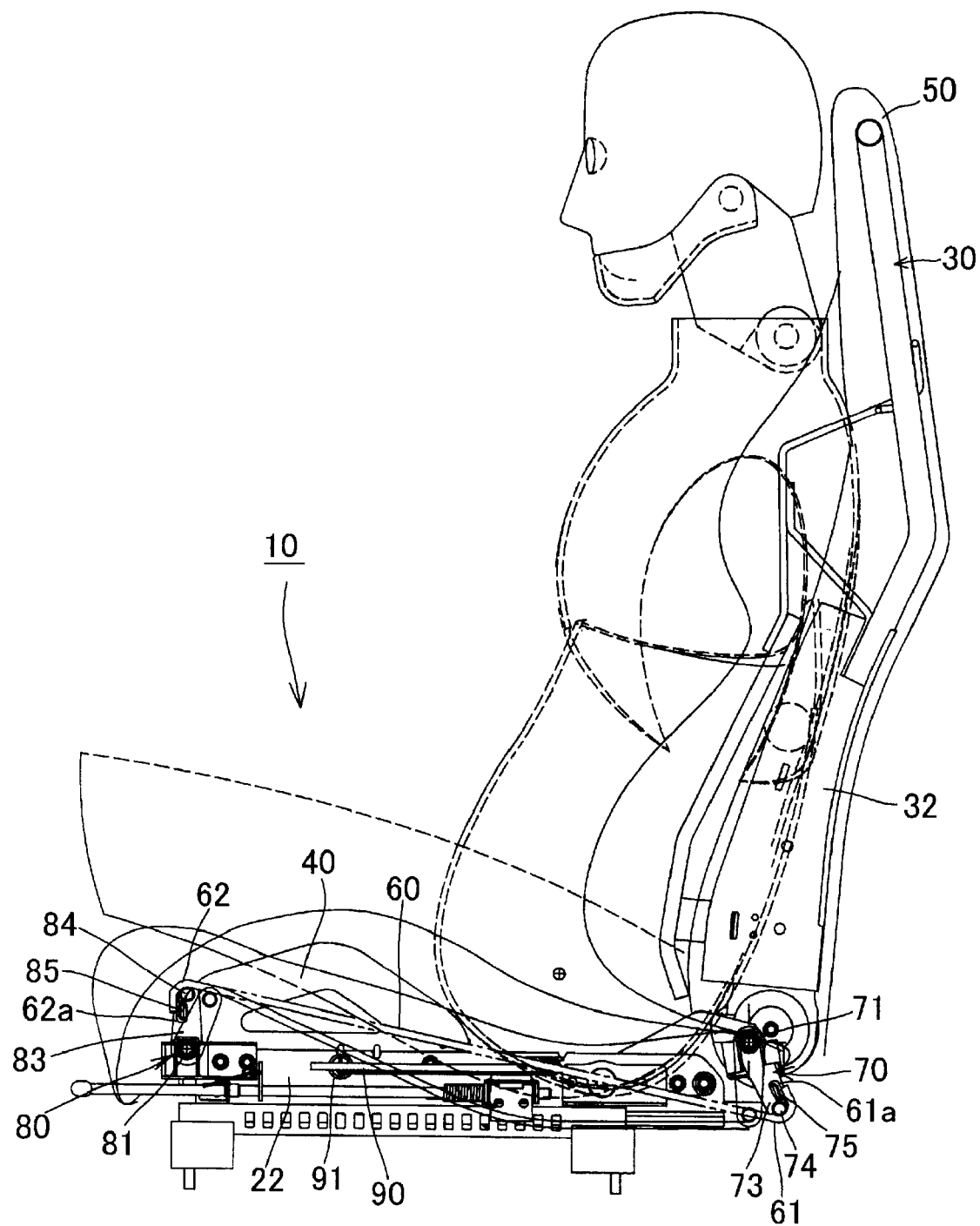
FIG. 2 is a sectional arrow diagram taken from the line A-A in FIG. 1.

Hereinafter, the present invention will be further explained in detail based on embodiments shown in the drawings. FIGS. 1 and 2 are views showing a seat structure 10 according to one embodiment of the present invention. The seat structure 10 includes a seat frame 20 and back frame 30. The seat frame 20 includes side frames 21 and 22 disposed at a predetermined distance together with a front frame (not shown). A cushioning member 40 for a seat cushion is disposed to cover the side frames 21, 22, and the like by stretching across these frames. The back frame 30 includes side frames 31 and 32 disposed at a predetermined distance and a top frame 33 to form a headrest portion in the present embodiment, and a cushioning member for the seat back 50 is disposed stretching across these side frames 31, 32 and the like to cover the side frames 31 and 32, and the like.

It is possible to use a structure having a two-dimensional cloth (a knitted fabric, an oven fabric, a net or the like) layered with a thin urethane material as the cushioning member 40 for a seat cushion or the cushioning member 50 for a seat back, but it is preferable to use a solid knitted fabric (a three-dimensional net member). The solid knitted fabric has a high restoration ability and a moderate elasticity though it is thin. Therefore, it exhibits soft spring characteristics when a load is focused on one point, but is high in facial rigidity at a facial contact with a predetermined magnitude and has a characteristic to exhibit hard spring characteristics. For instance, since in load-deflection characteristics using a press board having a diameter of 30 mm which corresponds to a protruding human bone, a soft spring characteristic works, and in load-deflection characteristics using a press board having a diameter of 98 mm, a spring characteristic having a high facial rigidity and high linearity works. The solid knitted fabric has a spring characteristic having a tendency close to the case of measuring a buttock muscle of a human with press boards 30 mm in diameter and 98 mm in diameter. Accordingly, when the solid knitted fabric is used as a cushioning member 40 for a seat cushion or a cushioning member 50 for the seat back, a layer with high facial rigidity, which has characteristics close to a human muscle is disposed, which makes it possible to effectively disperse an external force without a feeling of something foreign caused by a partial depression.

The solid knitted fabric is fabric having a stereoscopic three-dimensional structure including a pair of ground knitted fabrics disposed apart from each other and a number of connecting yarns connecting both by reciprocating between the pair of ground knitted fabrics. One of the ground knitted fabrics is formed with a flat knitted structure (fine mesh) made by, for instance, connecting yarn from twisted monofilaments in both directions of wales and course, and the other ground knitted fabric is formed in a stitch structure having a honeycomb-shaped (hexagon) mesh made of, for instance, yarn from twisted short fibers. It goes without saying that the knitted structure is arbitrary, and a knitted structure other than a fine mesh structure or a honeycomb-shaped structure can be adopted, and the combination is also arbitrary such as adoption of fine mesh structure for both fabrics. The connecting yarn is a yarn knitted between a pair of ground knitted fabrics so as to maintain a predetermined distance between one ground knitted fabric and the other ground knitted fabric, and serves to give a predetermined rigidity to the solid knitted fabric. The thickness of a ground yarn forming the ground knitted fabric is selected from a range able to provide necessary waist strength to the solid knitted fabric without causing any difficulty of assembly.

As a material for ground yarn or connecting yarn, a synthetic fiber or a regenerated fiber such as polypropylene, polyester, polyamide, polyacrylonitrile, rayon, etc., and a natural fiber such as wool, silk, cotton can be cited. These materials can be used alone, or can be used in combination arbitrarily. Preferably, thermoplastic polyester resins such as polyethylene terephthalate (PET), polybutylene terephthalate (PBT) and the like, polyamide resins such as nylon 6, nylon 66, and the like, polyolefin resins such as polyethylene, polypropylene, and the like, polytrimethylene terephthalate (PTT) or a resin obtained by combining two kinds or more of these resins can be used. Furthermore, polyester series resin is suitable due to excellent recycling ability. The shape of the ground yarn or the connecting yarn is not limited and circular section yarn, modified cross-section yarn or the like can be adopted.

The connecting yarn may be formed a loop-shaped stitch in the ground knitted fabrics existing in a front or back layers, or a structure to be stretched over the ground knitted fabric on the front layer and back layer by an insertion system may be also adopted, but connection of the front layer and the back layer of the knitted fabric with at least two connecting yarns in a cross (X-shape) or in a truss by obliquely inclining in reverse directions to each other is preferable to improve a shape stability of the solid knitted fabric.

Note that the solid knitted fabric can be knitted by a knitting machine having two opposing rows of needle beds. As such a knitting machine, a double Raschel knitting machine, double circular knitting machine, weft knitting machine with a V bed, and so on can be cited. In order to obtain a solid knitted fabric excellent in size stability, it is preferable to use a double Raschel knitting machine.

A base net 60 is disposed under the cushioning member 40 for a seat cushion. The base net 60 is elastically stretched on the seat frame 20 to perform a function to improve a sense of stroke during seating, a function to prevent bottom touch, or a function to absorb vibration. Material to form the base net 60 is not limited, two-dimensional cloth (knitted fabric, woven fabric, net form, or the like) can be used or the above-described solid knitted fabric (three-dimensional net member) can be also used.

The base net 60 is supported by a base net supporting mechanism for a seat cushion provided with a first torsion bar unit 70 disposed in the rear of the seat cushion and a second torsion bar unit 80 disposed in the front of the seat cushion. It should be noted that the rear of the seat cushion refers to the vicinity of the rear end of the side frames 21 and 22 composing the seat frame 20, or the vicinity of the lower end of the side frames 31 and 32 composing the back frame 30, and the front of the seat refers to the vicinity of the front end of the side frames 21 and 22 composing the seat frame 20.

Concretely, the first torsion bar unit 70 includes a torsion bar (hereinafter, referred to as "rear torsion bar") 71, both ends of which are supported by attachment metal fittings 21a and 22a provided in the vicinities of the rear ends of the side frames 21 and 22 of the seat frame 20, arms (hereinafter referred to as "rear arm") 72 and 73 connected to both ends of the rear torsion bar 71 respectively, and a supporting frame (hereinafter referred to as "rear supporting frame") 74 provided between two rear arms 72 and 73, along the width direction of the seat, similarly to the above-described rear torsion bar 71. As a result of being formed as above, the rear arms 72 and 73, and the rear supporting frame 74 pivot in front and behind around the rear torsion bar 71 as a fulcrum, and when twisted due to pivoting, they tend to return to an initial state owing to the elastic force of the rear torsion bar 71.

The second torsion bar unit 80 includes a torsion bar (hereinafter, referred to as "front torsion bar") 81, both ends of which are supported by attachment metal fittings 21b and 22b provided in the vicinity of the front end of the side frames 21 and 22 of the seat frame 20, arms (hereinafter referred to as "front arm") 82 and 83 connected to both ends of the front torsion bar 81 respectively, and a supporting frame (hereinafter referred to as "front supporting frame") 84 provided between two front arms 82 and 83, along the width direction of the seat cushion, similarly to the above-described front torsion bar 81. In the present embodiment, the front arms 82 and 83 are provided so as to protrude above the front torsion bar 81 serving as a fulcrum, pivot in front and behind around the front torsion bar 81 as a fulcrum, and when twisted due to pivoting, they tend to return to an initial position by the elastic force of the front torsion bar 81.

The base net 60, a rear end 61 thereof being connected to the rear supporting frame 74 of the first torsion bar unit 70, while a front end 62 thereof being connected to the front supporting frame 84 of the second torsion bar unit 80, is provided in a manner to be pulled forward and rearward when a load is applied to the base net 60 owing to the respective elastic force of the rear torsion bar 71 and the front torsion bar 81.

Here, when a person takes a seat, a load is applied from the upper side of the base net 60. To this application direction of the load, in the first torsion bar unit 70, the rear torsion bar 71 serving as a fulcrum of rotation movement is provided to position upper than the rear supporting frame 74, and in the second torsion bar unit 80, the front torsion bar 81 serving as a fulcrum of rotation movement is provided to position lower than the front supporting frame 84. Accordingly, it is set such that when load fluctuation occurs during a seating action or pedal operation of a person, or input of vibration, the front arms 82 and 83 connected to the front torsion bar 81 are more movable than the rear arms 72 and 73 connected to the rear torsion bar 71. By setting as above, the front arms 82 and 83 are more sensitive to load fluctuation, and especially, high frequency vibration absorption is enhanced. However, the higher sensitivity of the front arms 82 and 83 is based on the difference in layout of the above torsion bar, arm, and supporting frame. That is, the sensitivity of the front arms 82 and 83 is higher by nature due to difference in layout. Accordingly, supposing that the length of the front arms 82 and 83 are the same as that of the rear arms 72 and 73, the sensitivity of the front arms 82 and 83 becomes too high, and as a result the front arms 82 and 83 abut on annular type frames 21d and 22d (will be described later) serving as stoppers of the front arms 82 and 83 too soon, easily causing a sense of bottom touch. Therefore, the length of the front arms 82 and 83 is preferably set in the range from 90% to 60% of the length of the rear arms 72 and 73, more preferably from 80% to 70%.

Figure 3:
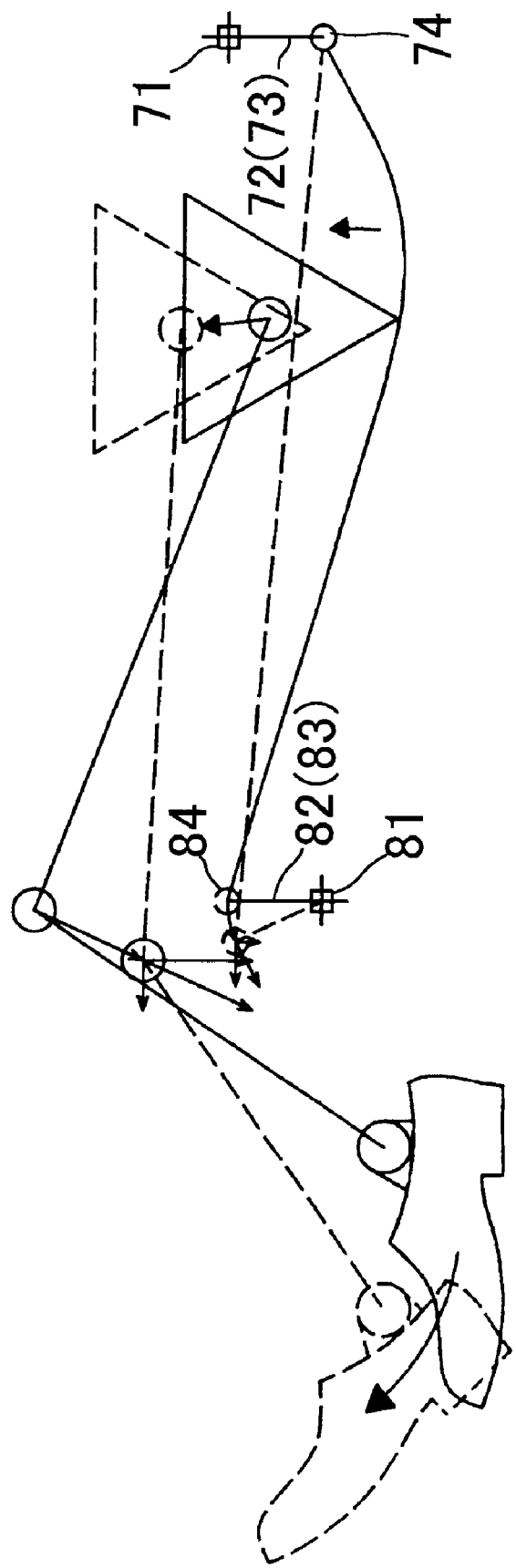
FIG. 3 is a schematic diagram to explain the functioning of the seat structure during pedal operation according to the above-described embodiment.

As shown in FIGS. 2 and 5, in the first torsion bar unit 70, an engaging bracket (rear engaging bracket) 75 is provided protruding upward on the rear supporting frame 74, the rear end 61 of the base net 60 is drawn rearward after passing through beneath the rear supporting frame 74, and a portion 61a to be engaged composed of a substantially U-shaped plate member provided in the rear end 61 is engaged with the rear engaging bracket 75, so that the rear end 61 of the base net 60 is fixed so as to wind around from beneath the rear supporting frame 74. In the second torsion bar unit 80, an engaging bracket (front engaging bracket) 85 is provided protruding downward on the front supporting frame 84, the front end 62 of the base net 60 is drawn forward after passing through above the front supporting frame 84, and a portion 62a to be engaged composed of a substantially U-shaped plate member provided in the front end is engaged with the front engaging bracket 85, so that the front end 62 of the base net 60 is fixed so as to wind around the front supporting frame 84 from above thereof. By configuring as above, when a load is applied to the base net 60 from above, the base net 60 displaces so as to wind around the front supporting frame 84 of the second torsion bar unit 80 disposed in the front, and as for the rear supporting frame 74 of the first torsion bar unit 70 disposed at the rear, the base net 60 displaces so as to be peeled off from the rear supporting frame 74. In the vicinity of the rear end 61 of the base net 60, a large component of force works against the rear supporting frame 74 in a direction to peel the base net 60 off from the rear supporting frame 74, the direction being in the direction of gravitation, due to a load from above, and the function of the component of a force in the horizontal direction to rotate the arms 72 and 73 is small. Whereas, since a load at the time of seating works around a point beneath the ischium node, the distance from the position corresponding to the point beneath the ischium node to the front supporting frame 84 is longer than that to the rear supporting frame 74. Accordingly, as for the front supporting frame 84, when taking a seat, the component of a force pulling the front supporting frame 84 in the horizontal direction, in other words, a force component to rotate the front arms 82 and 83 in a rearward-tilting direction works greatly. As a result, a difference in magnitude is created between the component forces of the rear arms 72, 73 and the front arms 82, 83. Moreover, when pressing a pedal fully, as shown in FIG. 3, the knee is displaced in an extending direction and the buttocks are raised. At this time, since the base net 60 displaces upward following the buttocks, the front arms 82 and 83 of the second torsion bar unit 80 are ready to pivot in nearly the same direction as the moving direction of the knee.

In the supporting frame of the torsion bar unit disposed in the above-cited Patent Documents 1 to 5, as shown for reference in FIGS. 7A and 7B, after the rear end of the base net is wound around the supporting frame from above or from under the supporting frame, the rear end of the base net is drawn toward the front end of the base net, and both portions are overlapped at a position toward the front end side from the rear end. In other words, the vicinity of the base net rear end is connected so as to form a cylinder in a state of the supporting frame being inserted. Accordingly, when no load is applied, it is in a state shown in FIG. 7A, but when a load is applied, a couple works to create a bending moment in the direction shown by the arrow as shown in FIG. 7B. As a result, a feeling of the base net displacing downward is sensed which generates a feeling of something foreign. Further, when a load is applied, the base net connected to the supporting frame in a cylindrical shape rotates along the peripheral surface of the supporting frame, creating friction. As a result, when a connection structure between the base net and the supporting frame is made similarly to a conventional structure, if, firstly, the conventional structure is used on the front supporting frame 84 side, a part of the load is received by this friction, which cancels a force to rotate the front supporting frame 84 and the front arms 82, 83 around the front torsion bar 81, which results in lowering the sensitivity. If, secondly, the conventional structure is used in the rear supporting frame 74 side, a force in the direction of gravity to peel off the base net 60 from the rear supporting frame 74 is weakened, and since the rear end of the base net 60 is drawn in a rearward upward-tilting direction, a sense of seating on a hammock, which is a feeling as if pushed from behind by the buttocks or pelvis. Thus, connection of the rear end 62 and the front end 61 of the base net 60 to the respective supporting frames 74 and 84 is preferably carried out by providing engaging brackets 75 and 85 as described above.

Figure 6A:
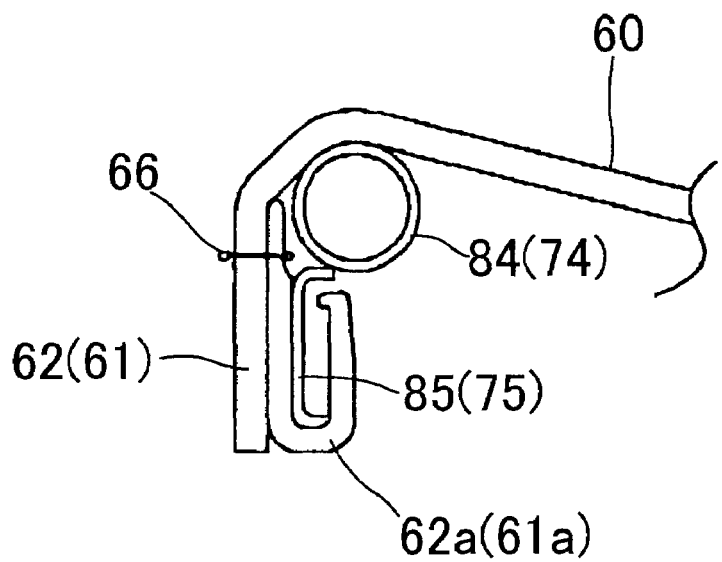
FIGS. 6A and 6B are views showing preferable examples of the engaging method of the base net.
Figure 6B:
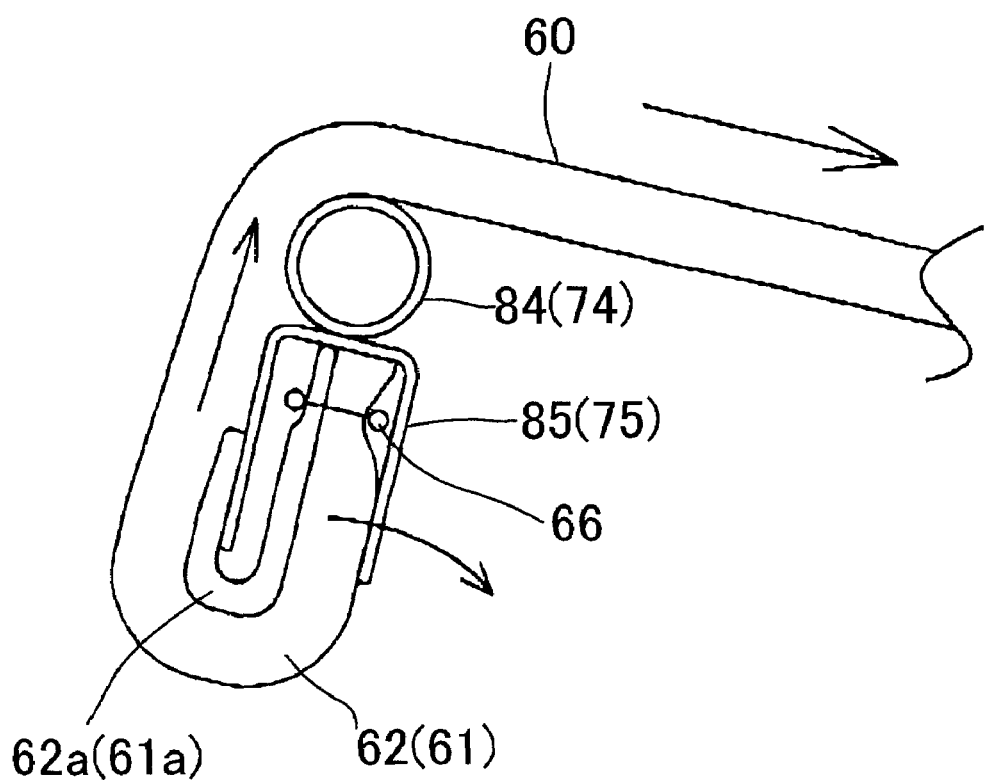

In FIG. 2, merely a plate-like article is used as the engaging bracket 75 or 85 as shown in details in FIG. 6A. Whereas, in FIG. 5, a substantially U-shaped engaging bracket 75 or 85 is attached as shown in details in FIG. 6B. It is possible to use both as the engaging brackets 75 and 85. In a case of a plate as shown in FIG. 6A, since the front end 62 (or the rear end 61) is only connected to the portion 62a to be engaged (or the portion 61a to be engaged) made of a substantially U-shaped plate member with sewing thread 66, a load applied to the base net 60 is supported by the strength of the portion 62a (61a) to be engaged and the sewing thread 66. Accordingly, when a solid knitted fabric is used as the base net 60, a position to connect with the sewing thread 66 is displaced due to the load, unexpected elongation of the base net occurs, and durability problems also arise. Therefore, as shown in FIG. 6B, using the engaging bracket 75 or 85 in a substantially U shape, it is preferable to structure the end of the base net such that the portion 62a to be engaged (or the portion 61a to be engaged) connected to the front end 62 (or the rear end 61) by the sewing thread 66 is inserted into and connected with the inside of the substantially U-shaped engaging bracket 75 or 85. By taking this structure, when a load is applied, a portion inserted into the substantially U-shaped engaging bracket 75 or 85 displaces in the direction of rotation, and friction is produced between the inner surface of the portion 62a (61a) to be engaged and one wall portion of he substantially U-shaped engaging bracket 75 or 85, and between the outer surface near the upper end of a portion to be inserted and the other wall portion of the substantially U-shaped engaging bracket 75 or 85. Therefore, since the load applied to the base net 60 is converted into the change of shape owing to displacement of the portion inserted in the substantially U-shaped engaging bracket 75 or 85 in the direction of rotation, and the above-described friction, the force applied to the connecting portion to the sewing thread 66 can be cancelled and unnecessary elongation of the base net 60 can be suppressed.

An auxiliary elastic mechanism to support the load together with the base net 60 is provided under the base net 60. The auxiliary elastic mechanism of the present embodiment includes an auxiliary net 90 and a coil spring 91. Concretely, the auxiliary net 90 has a size extending from near the center to the vicinity of the front of the base net 60 and is stretched across the side frames 21 and 22 of the seat frame 20 via the coil spring 91. As the auxiliary net 90, the above-described two-dimensional cloth or a solid knitted fabric can be used. The auxiliary net 90 especially performs functions to firmly support body weight and prevent bottom touch with the rear torsion bar 71. Since the auxiliary net 90 is provided at a position corresponding to the vicinity from near the center to the front of the base net 60, and when a person is seated, the position of the auxiliary net 90 displaces a little further forward than the position corresponding to a point beneath the ischium node, and the auxiliary net 90 also has functions to prevent the buttocks from displacing forward when seating and maintain a stably seated posture.

According to the present embodiment, since positional relation between the rear arms 72, 73 and the rear supporting frame 74 composing the first torsion bar unit 70, and the rear torsion bar 71 which serves as their fulcrum; and positional relation between the front arms 82, 83 and the front supporting frame 84 composing the second torsion bar unit 80, and the front torsion bar 81 which serves as their fulcrum; are set as above, and the force component owing to the base net 60 works as above, easiness to move when a load is applied to the base net 60 via the cushioning member 40 for a seat cushion differs. When seating, mainly the front arms 82, 83 and the front supporting frame 84 of the second torsion bar unit 80 moves in a rearward-tilting direction using the front torsion bar 81 as a fulcrum against the elastic force of the front torsion bar 81. In other words, when seating, the front arms 82 and 83 effectively stroke and the amount of displacement is great. Accordingly, when seating, a feeling of stroke mainly felt at the back side of the femur and the buttocks is increased so that a feeling of sitting on is improved. Moreover, since it is structured such that the front arms 82 and 83 effectively stroke as described above, and at the same time, the tension of the base net 60 works to the front torsion bar 81 all the time, even when a thin solid knitted fabric or a thin urethane material or the like having a thickness of 30 mm is used as a cushioning member 40 for a seat cushion, there is no sense of hitting in spite of disposing the front supporting frame 84. Since the second torsion bar unit 80 works in this manner, is more effective in operation than the rear arms 72, 73 and the supporting frame 74 of the first torsion bar unit 70, and a pushing up force by the first torsion bar unit 70 disposed behind is small, the surface rigidity is enhanced, and supporting of the buttocks by the base net 60 beneath the ischium node is more uniform, so that a net, a plastic board or the like disposed conventionally to supplement a shortage of a sense of continuity becomes unnecessary.

In a static seating state after the seating movement is finished, a heaviest load is applied in the vicinity beneath the ischium node, but since the rear arms 72 and 73 of the first torsion bar unit 70 are more difficult to move than the front arms 82 and 83 of the second torsion bar unit 80, as described above, it is possible to firmly support a load due to human weight without touching bottom owing to the function of an elastic force of the rear torsion bar 71 of the first torsion bar unit 70. Additionally, at this time, the elastic force of the auxiliary net 90 and the coil spring 91 works in an auxiliary manner to suppress deviation of the buttocks forward and to stabilize the seating posture.

The respective elastic forces of the rear torsion bar 71 of the first torsion bar unit 70, the front torsion bar 81 of the second torsion bar unit 80, and the coil spring 91 supporting the auxiliary net 90 work synergistically to the vibration inputted via the vehicle body floor during driving. To the vibration in a high-frequency, the elastic force of the front torsion bar 81 mainly works and the elastic force of the coil spring 91 works in an auxiliary manner at the same time, and to low-frequency vibration around the resonance point, the elastic force of the rear torsion bar 71 and the elastic force of the front torsion bar 81 works in a series alignment, which lowers a spring constant, and the damping ratio is increased due to looseness of a tension structure including the base net 60 and cushioning member for a seat cushion strained to the seat frame 20 at a predetermined tension, so that damping occurs. The elastic force of the coil spring 91 also works in a supplemental manner. Since the rear torsion bar 71 and the front torsion bar 81 form a serial connection spring structure via the base net 60, the spring constant changes from k to k/2 depending on whether one works mainly or both work together, and the damping ratio varies following the change. By changing the damping ratio from moment to moment as above, vibration transmissibility characteristics in the high-frequency region are especially improved, and a sense of being shaken by various mechanical elements of a vehicle body is cancelled and an unpleasant feeling is eased.

Figure 4:
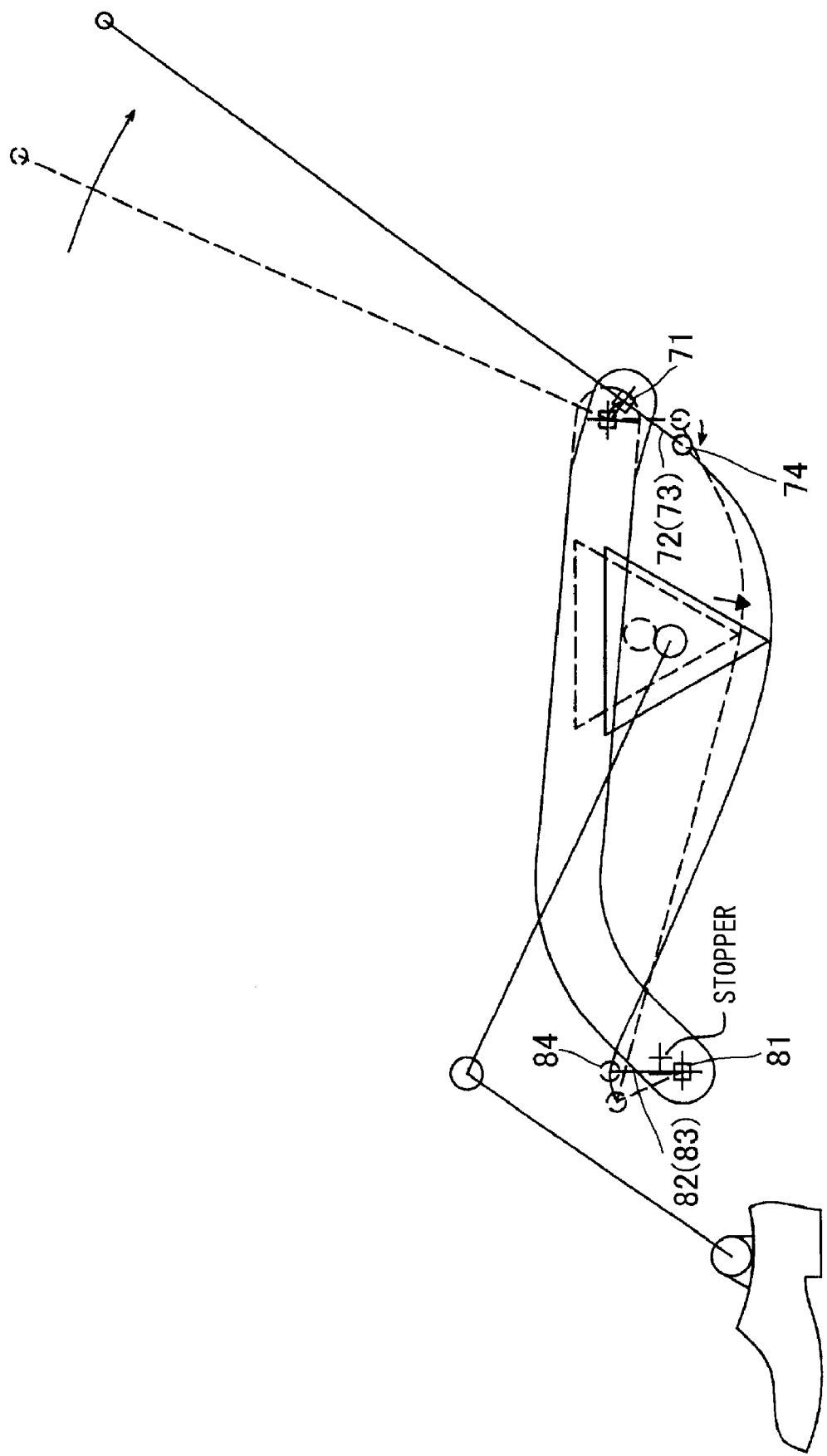
FIG. 4 is a schematic diagram to explain the functioning of the seat structure during impact according to the above-described embodiment.

When impact is inputted, as shown in FIG. 4, a large load is applied to the seat back in the rear, and the vicinity of the rear portion of the side frame of the seat cushion elastically deforms downward. At this time, the first torsion bar unit 70 provided with the rear supporting frame 74 engaged with the rear end of the base net 60 displaces in a lower rearward-tilting direction. The arms 82, 83 and the supporting frame 84 of the second torsion bar unit 80 return from a state of forward-tilting to a rearward-tilting state by pushed by the leg. Accordingly, the base net 60 is loosened temporarily, the damping ratio is increased, and the impact force is also relieved. Here, a far larger impact force such as a traffic accident is taken into consideration. In this case, an elastic deformed portion of the above-described side frame for a seat cushion is undergone plastic deformation. Thereby, the base net 60 is pushed further downward. Then, due to the force, the front arms 82 and 83 abut on a stopper which is placed on the rearward-tilting side of the front arms 82, 83 of the second torsion bar unit 80 and restricts the range of pivoting of the front arms 82 and 83. Moreover, by deformation or displacement of the stopper, the controlling position of the front arms 82 and 83 shifts further rearward, so that the base net 60 further loosens, which results in further increase of the damping ratio. The structure of the present embodiment also includes a function to relieve an impact force against a human body as above. The front arms 82 and 83 are surrounded by the annular type frames 21*d* and 22*d* in FIG. 1, in the present embodiment, the portions positioned on the rearward-tilting side of the arms 82 and 83 out of the annular type frames 21*d* and 22*d* work as a stopper to control the range of pivoting on the rearward-tilting side, and portions positioned on the forward-tilting side of the arms 82 and 83 work as a stopper to control the range of pivoting to a forward-tilting direction. The pivoting range of the front arms 82 and 83 to abut on the stoppers is preferably set in the range of 40° at maximum around the front torsion bar 81 in both forward-tilting and rearward-tilting direction respectively, and more preferably in the range of 25° to 35°. Through this setting, it is possible to perform a function of impact absorption as described above by abutting on the stoppers when a load greater than a predetermined limit is applied as above.

Figure 8:
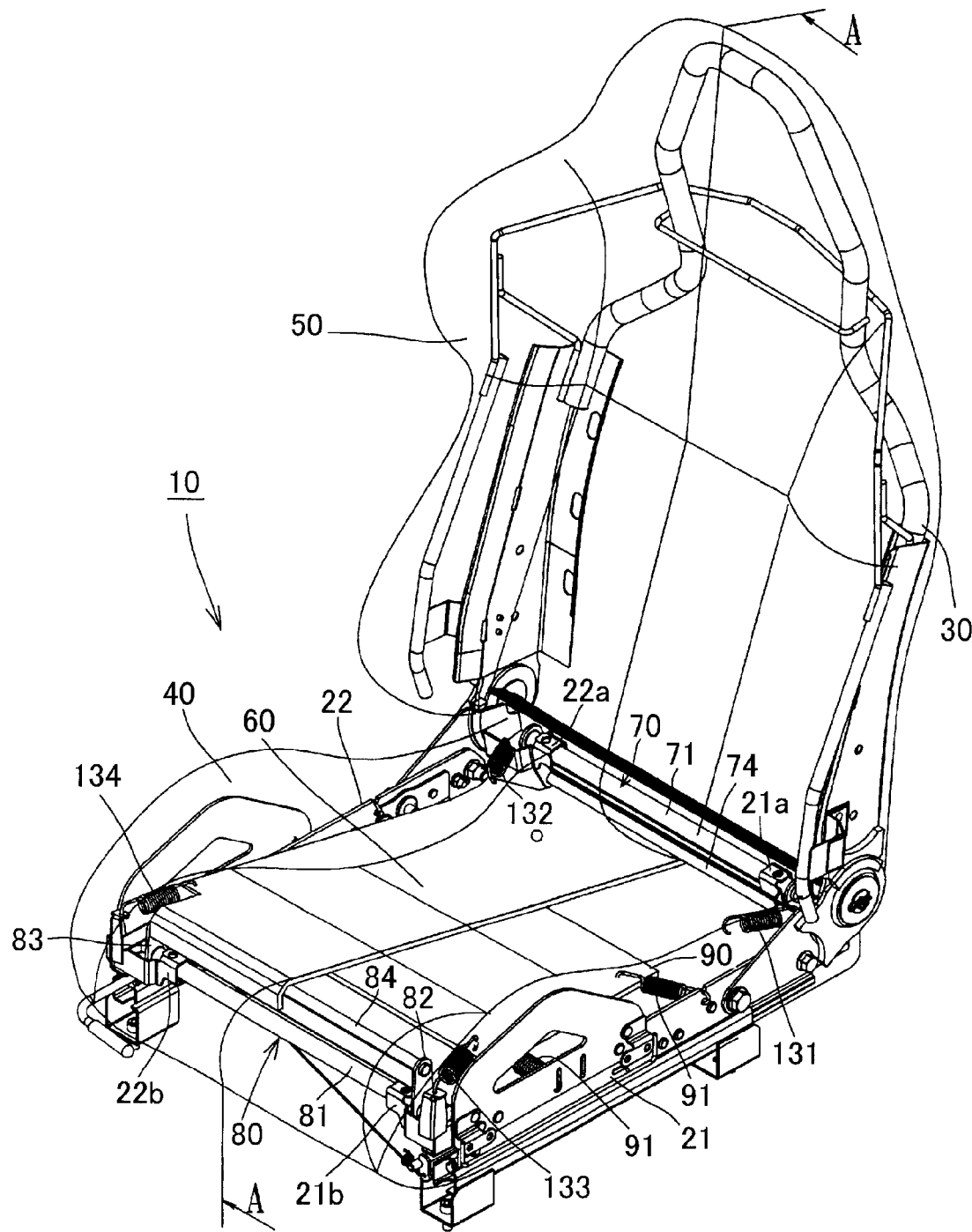
FIG. 8 is a view showing a seat structure according to another embodiment of the present invention.
Figure 9:
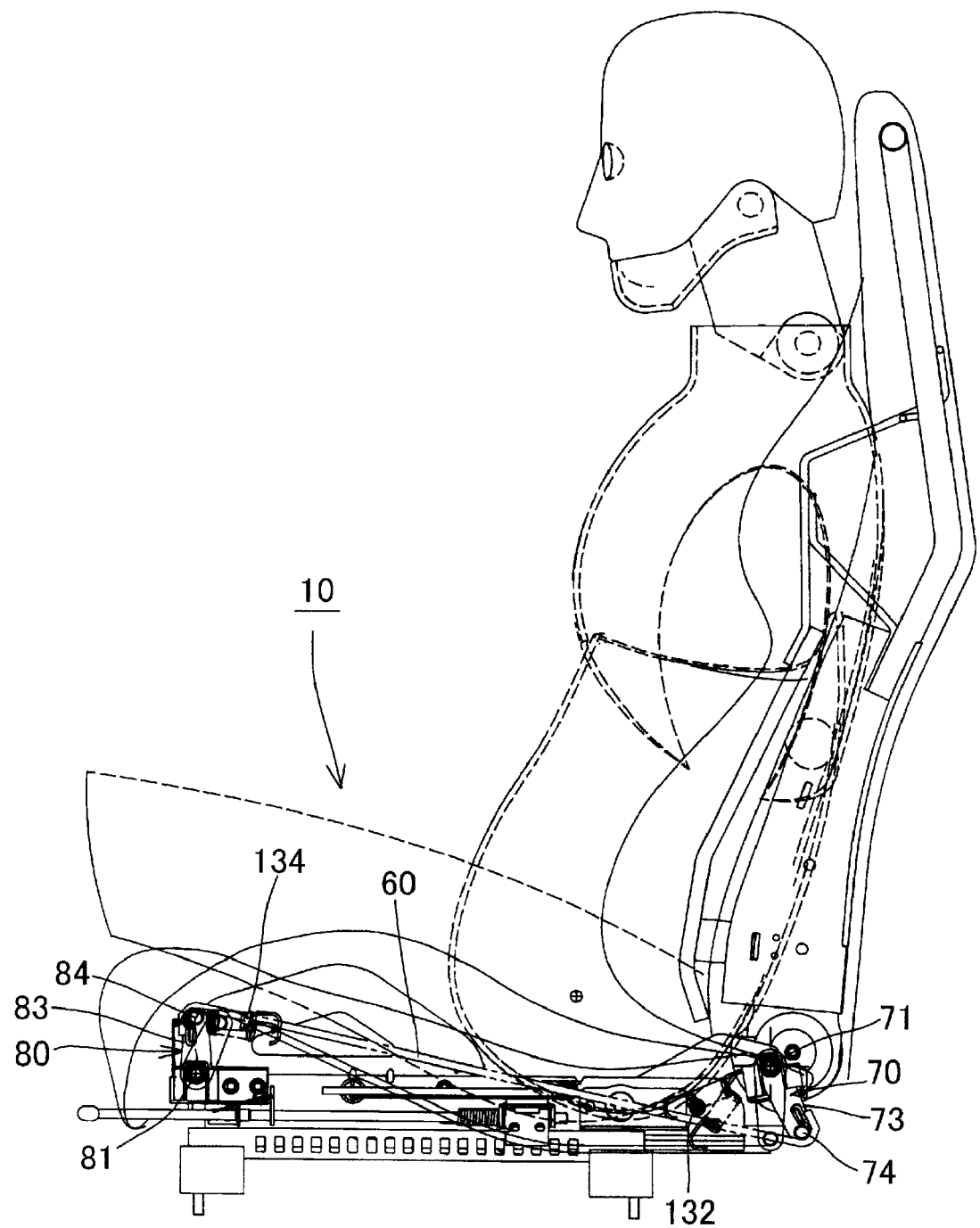
FIG. 9 is a sectional arrow diagram taken from the line A-A in FIG. 8.

FIGS. 8 and 9 are views showing another embodiment of the present invention. In the present embodiment, the first side ends of first adjusting springs 131 and 132 are engaged with metal fittings 21*a* and 22*a* supporting the rear torsion bar 71 of the first torsion bar unit 70 disposed in the rear of the seat cushion, and respective other ends are engaged in the vicinity of both rear end sides of the base net 60. Further, the first side ends of second adjusting springs 133, 134 are engaged with metal fittings 21*b*, 22*b* supporting the front torsion bar 81 of the second torsion bar unit 80 disposed at the front of the seat cushion, and the other ends are engaged with the vicinities of front end both sides of the base net 60. Other configurations are the same as the embodiments shown in FIGS. 1 and 2 described above.

In the present embodiment, by providing the first and second adjusting springs 131 to 134 as above, in addition to the elastic forces of the rear torsion bar 71 and the front torsion bar 81, the elastic force of the adjusting springs 131 to 134 work. As a result, a structure with a strong feeling of springiness can be realized compared with the seat structures shown in the embodiments shown in FIGS. 1 and 2 so that body weight can be more firmly supported. When vibration is inputted, since these adjusting springs 131 to 134 work together with the rear torsion bar 71 and the front torsion bar 81, it is possible to perform adjustment of a feeling of springiness or a damping property with a simple structure. It is also possible to make a structure such that the first and second adjusting springs 131 to 134 are disposed only in front or in the rear of the seat. Furthermore, in the present embodiment, two pieces each of the first and second adjusting springs 131 to 134 are disposed, but the number of springs disposed is not limited. It is also possible that the number of the first adjusting springs 131, 132 disposed differs from the number of the second adjusting springs 133, 134 disposed.

Figure 10:
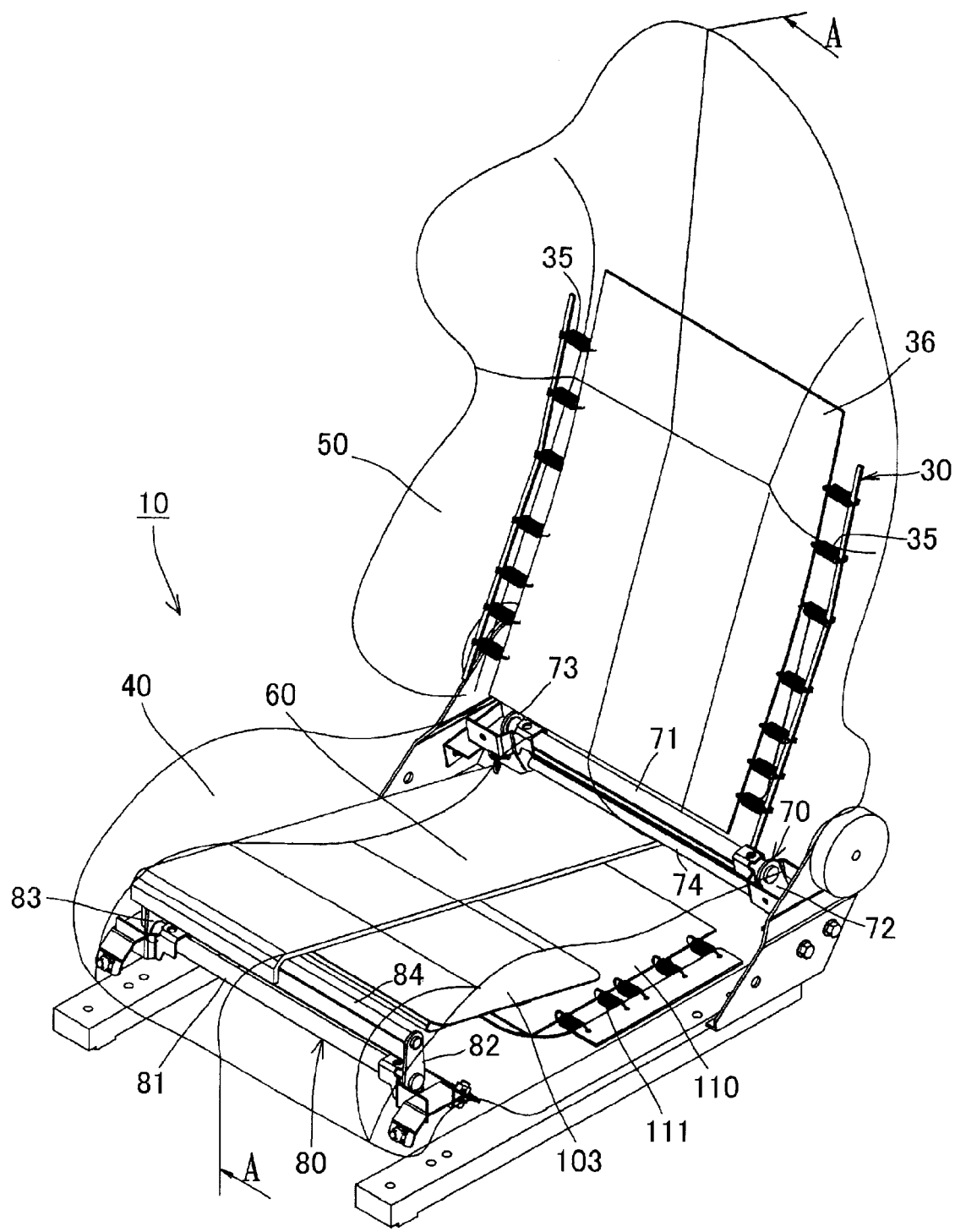
FIG. 10 is a view showing a seat structure according to still another embodiment of the present invention.
Figure 11:
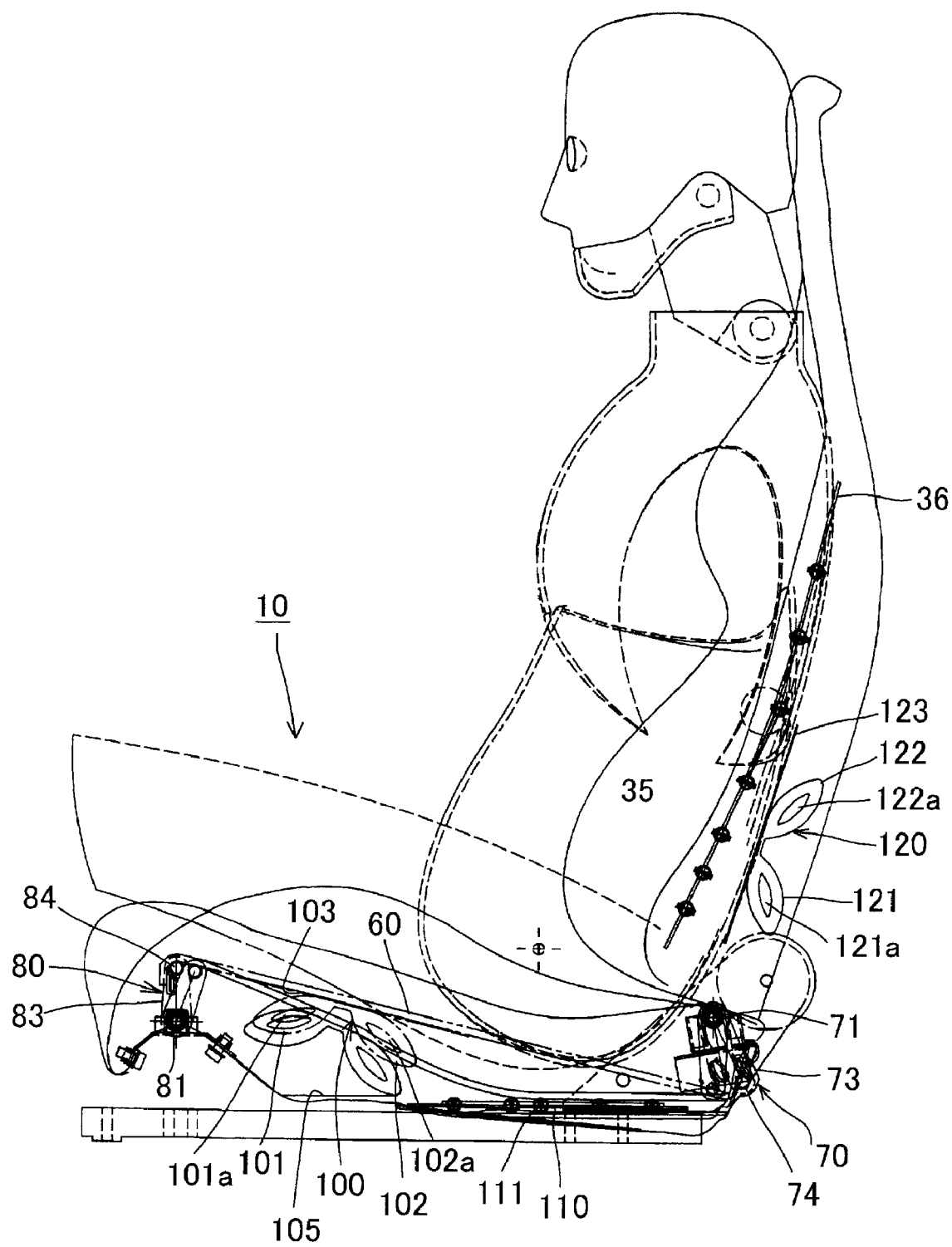
FIG. 11 is a sectional arrow diagram taken from the line A-A in FIG. 10.

FIGS. 10 and 11 are views showing still another embodiment of the present invention. In the present embodiment, structures of the first torsion bar unit 70 and the second torsion bar unit 80 composing the base net supporting mechanism for a seat cushion and supporting the base net 60 are the same as that in the above-described embodiment. Accordingly, the base net supporting mechanism for a seat cushion provided with the first torsion bar unit 70 and the second torsion bar unit 80 improves a feeling of sitting on and a seating comfort, and enhances vibration absorbency similarly to the above embodiments.

However, in the present embodiment, an auxiliary elastic mechanism is not composed of the auxiliary net 90 and the coil spring 91 as in the above embodiment, but includes an air cushion 100 instead of the auxiliary net 90. The air cushion 100 includes a plurality (two in the present embodiment) of partitioned bulging portions 101 and 102, and a flexible plate 103 integrally fixed at a border portion of these bulging portions 101 and 102, the flexible late 103 is fixed on the rear surface of the base net 60, and provided at a position corresponding to the vicinity from near the center to the front of the base net 60. The bulging portions 101 and 102 are formed in a nearly cylindrical shape with a processed solid knitted fabric, and air bags 101*a* and 102*a* having air inlets are arranged inside the bulging portions. A pump (not shown) is connected to the air inlets provided in the air bags 101*a* and 102*a*, so that the amount of air to be injected can be adjusted. Moreover, under the bulging portions 101 and 102, an auxiliary plate 105 fixed to the seat frame 20 is provided so that the bulging portions 101, 102 abut and exhibit prescribed elastic force when the base net 60 moves downward.

Through this structure, similar to the auxiliary elastic mechanism in the above-described embodiment, functions to firmly support body weight, especially together with the rear torsion bar 71, and prevent bottom touch are performed, and since the air cushion 100 is disposed a little further forward than a position corresponding to the point under the ischium node when a person is seated, functions to prevent forward displacement of the buttocks and maintain a stable seating posture during seating, are exhibited. It is preferable to set the air cushion 100 not to abut on the auxiliary plate 105 in a case of high frequency vibration with a small displacement. It is thereby possible to suppress transmission of vibration via the auxiliary plate 105.

It should be noted that symbol 110 in FIGS. 10 and 11 denotes a rear auxiliary net provided downward at a distance from the base net 60, placed at a position corresponding to the area on the base net 60 from near the center to the rear, and symbol 111 denotes a coil spring elastically supporting the rear auxiliary net. These are provided to further suppress a sense of bottom touch when a large load is applied, because the load applied to a position corresponding to the area on the base net 60 from near the center to the rear is great. If a member having a small spring constant is used as the rear auxiliary net 110, the damping property at the seat cushion is increased, while if a member having a large spring constant is used, a feeling of springiness at the seat suchion is increased. Therefore, it is possible to adjust a damping property and a spring characteristic of the whole seat cushion by the rear auxiliary net 110. Symbol 120 denotes a lumber support provided on the back surface side of a base net 36 for a seat back supported by the back frame 30 so as to be able to abut on an area from the pelvis to the lumbar vertebra. The lumber support 120 uses the same structure as the above-described air cushion 100, and is provided with two bulging portions 121 and 122, in which air bags 121a and 122a are incorporated, and a flexible plate 123 integrated with the bulging portions. Since it includes the flexible plate 123, compared with a conventional well-known lumber support, the bulging portions work as a sense of hitting with a larger curvature owing to to the flexible plate, which gives spring characteristic with high linearity. Accordingly, it becomes possible to follow to a change in curvature of the back bone with the third and fourth lumber vertebrae as a center without using a large force. Thereby, it is possible to support the lumber vertebra and pelvis without a feeling of something foreign. It also has a function to reduce transmission of vibration to the waist due to the spring characteristic with high linearity. In other words, the lumber support 120 has not only a function to support and adjust the waist but also a function to absorb vibration with a high frequency owing to linear spring characteristic. It is possible to structure the air bags 121a and 122a not to connect to a pump so that air can come in and come out all the time and a damping function due to air flow in the air bags 121a and 122a can be utilized in such a case.

Figure 12:
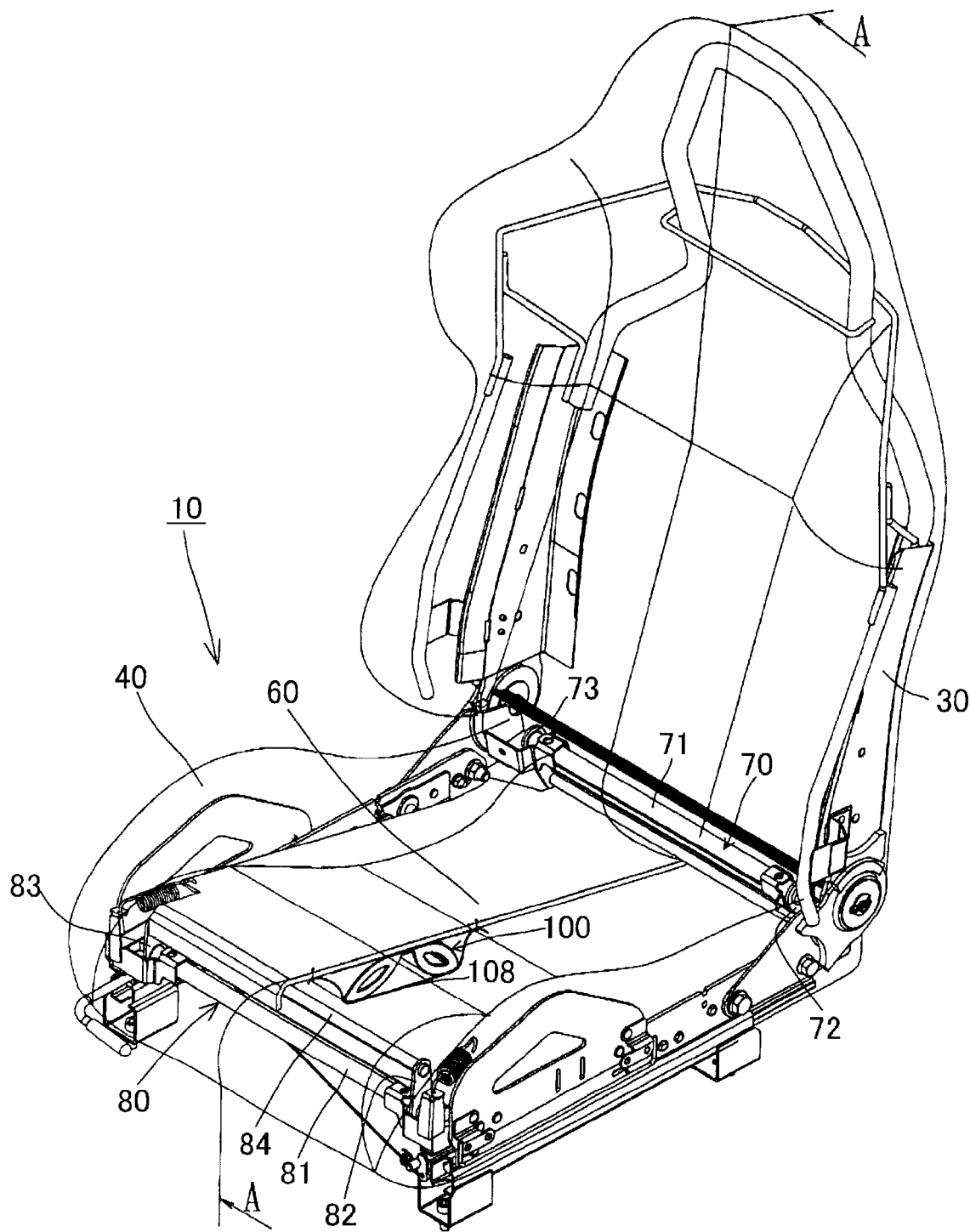
FIG. 12 is a view showing a seat structure according to yet another embodiment of the present invention.
Figure 13:
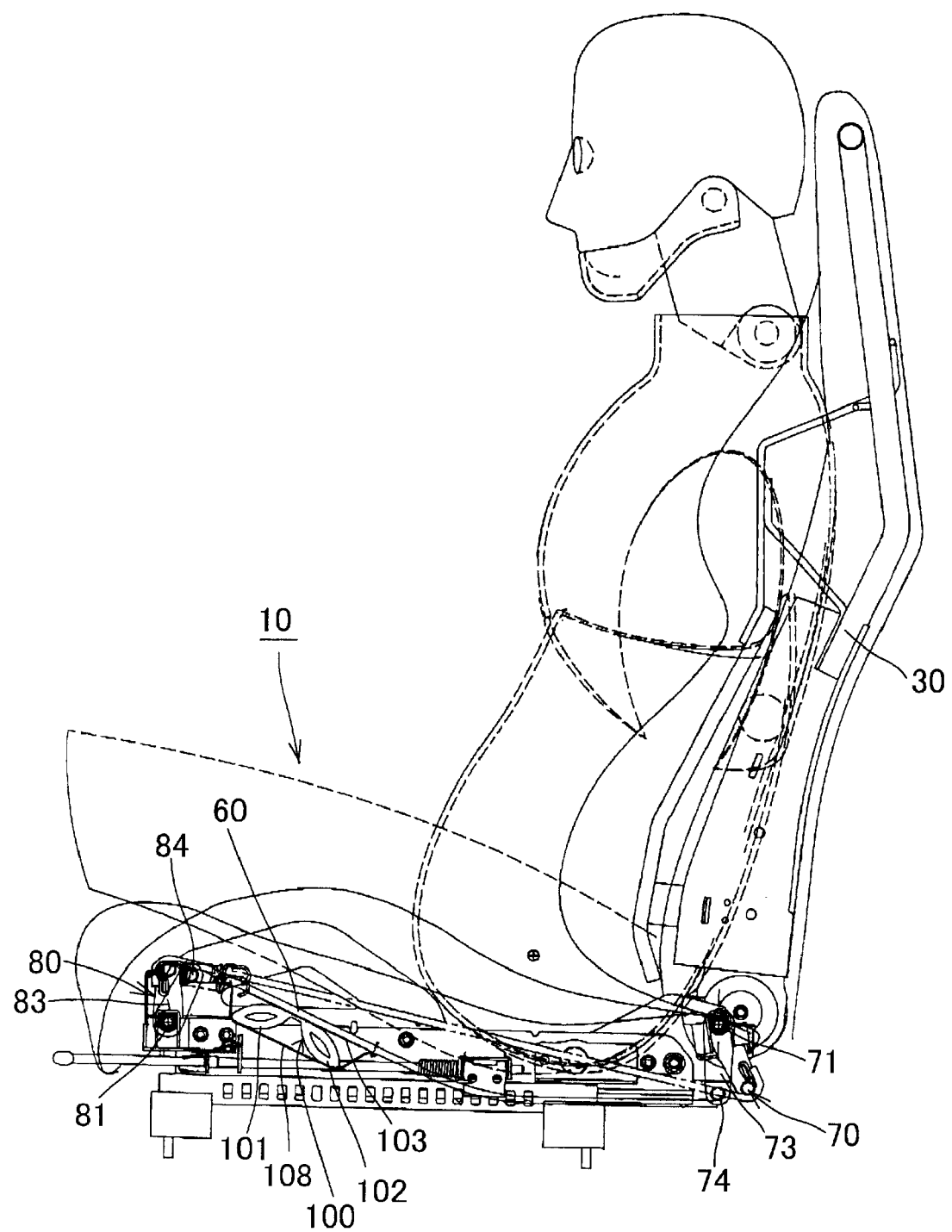
FIG. 13 is a sectional arrow diagram taken from the line A-A in FIG. 12.

FIGS. 12 and 13 are views showing still another embodiment of the present invention. The present embodiment is characterized in that the air cushion 100 shown in FIGS. 10 and 11 is structured to be covered with cloth material 108 provided by connecting the end to the base net 60, in other words, the air cushion 100 is inserted in the bag-shaped cloth material 108. When a person is seated or vibration is inputted, a range (area) surrounded by the base net 60 and the cloth material 108 is changed by tension change, and the shape of the air cushion 100 contacted with them changes so that the elasticity of the air cushion 100 works. In the embodiment shown in FIGS. 10 and 11, an auxiliary plate 105 is disposed below the air cushion 100 so as to let the elasticity of the air cushion 100 work. However, in the present embodiment, by disposing such a cloth material 108, provision of the auxiliary plate 105 to the seat frame 20 becomes unnecessary, which contributes to the simplification of the structure of and the weight reduction of the seat frame 20.

While in FIGS. 1, 2, 8, and 9, a structure stretching the cushioning member for the seat back 50 such as a solid knitted fabric or the like across the back frame 30 is shown as a structure of the back portion, in FIGS. 10 and 11, the base net for a seat back 36 is elastically disposed on the back frame 30 via coil springs 35 as described above, and the cushioning member for the seat back 50 is disposed so as to cover it. Moreover, the above-described lumber support 120 is provided on the back face side of the base net for a seat back 36. Since provision of the above-described base net supporting mechanism for a seat cushion is characteristic of the present invention, the structures of the seat back shown in these drawings are only examples, and the structure of the back is, of course, not limited to these. In the embodiment shown in FIGS. 10 and 11, it is also possible to provide a spring for adjustment as shown in FIGS. 8 and 9.

TEST EXAMPLE

Vibration transmissibility of the seat structure according to the embodiments of the present invention shown in FIGS. 10 and 11 (In FIG. 14, referred to as "spring constant variable: front and rear torsion bars") were measured. Note that, as for a seat cushion structure used in the example: a two-dimensional cloth material is used as the base net 60, a solid knitted fabric is used as the cushioning member 40 for a seat cushion, and the base net 60 is stretched across the seat frame 20 at an elongation percentage of less than 5%. For comparison, vibration transmissibility for the following structures were also measured. These were: a seat structure having the same structure as shown in FIGS. 10 and 11 excepting that the second torsion bar unit 80 in the seat structure shown in FIGS. 10 and 11 was not provided, and the front of the base net 60 was fixedly engaged to the front frame stretched between front ends of the side frames 21, 22 of the seat frame 20, in other words, a seat structure provided with a torsion bar unit (the first torsion bar unit) only in the rear of the seat (in FIG. 14, referred to as "spring constant fixed: rear torsion bar"); in contrast, a seat structure provided with a torsion bar unit (the second torsion bar unit) only in the front of the seat (in FIG. 14, referred to as "spring constant fixed: front torsion bar"); and a conventionally well-known seat structure provided with no torsion bar unit at all but a high dense, high elastic urethane foam of 90 mm in thickness (in FIG. 14, referred to as "full-foam urethane).

Figure 14:
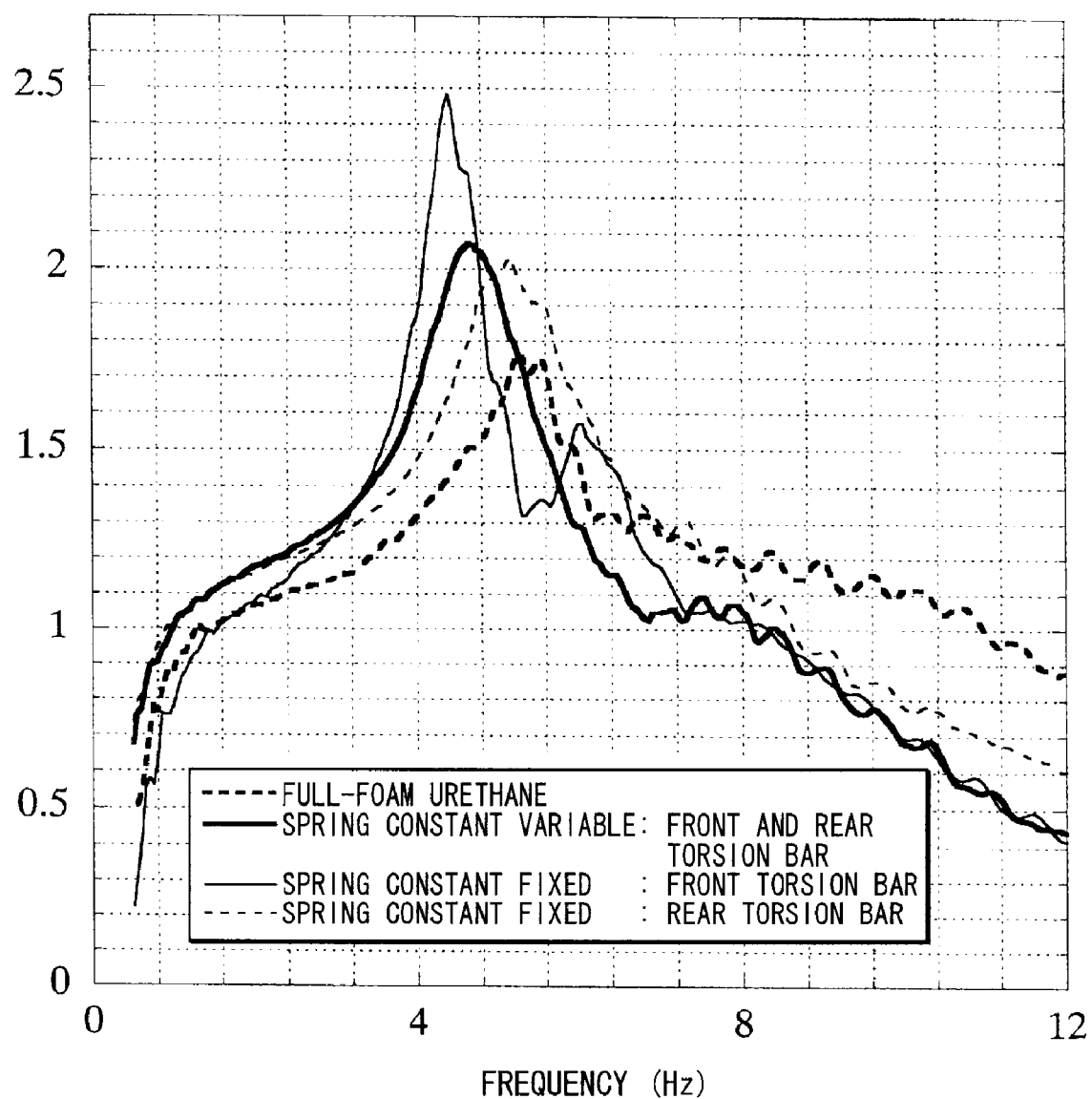
FIG. 14 is a view showing a result of vibration transmissibility measurement in a test example.

The vibration transmissibility was measured as follows. The respective seat structures described above were attached on a platform of a vibrator, and at the same time, an accelerator sensor was attached in the vicinity corresponding to a position beneath the ischium node of the cushioning member for a seat cushion, a Japanese male of 58 kg in weight was seated on the respective seat structures, and vibration was given under the conditions of a sine wave with unilateral amplitude of 1 mm (vertical peak-to-peak amplitude 2 mm), and vibration frequency 0.5 Hz to 15 Hz in 180 sec. The result is shown in FIG. 14.

Since the full-foam urethane has a resonance point exceeding 5 Hz, and the vibration transmissibility of the resonance point is as low as 1.7 Hz, the vibration absorbency characteristics of the full-foam urethane in a high frequency zone of 8 Hz or more show the worst value. On the other hand, a structure provided with a torsion bar unit in the rear of the seat (in FIG. 14, referred to as "spring constant fixed: rear torsion bar") shows that its resonance point is shifted to the lower frequency side a little compared with that of the full-foam urethane, and the vibration transmissibility at the resonance point is increased so that a feeling of spring characteristic is strengthened. As a result, it is shown that vibration absorbency in a high frequency area is more improved than with the full-form urethane.

Furthermore, the seat structure provided with a torsion bar unit (the second torsion bar unit) in the front of the seat (in FIG. 14, referred to as "spring constant fixed: front torsion bar") shows that its resonance point is shifted more to the lower frequency side compared with that of the structure provided with a torsion bar unit in the rear of the seat (in FIG. 14, referred to as "spring constant fixed: rear torsion bar"), and the vibration transmissibility at the resonance point is increased. This is because that the operational efficiency of the second torsion bar unit disposed in the front of the seat is more excellent than the case of disposing it in the rear of the seat, and attenuation owing to expansion and contraction of the base net 60 itself becomes small so that a feeling of spring characteristic is strengthened, and as a result, vibration absorbency in a high frequency area is further improved.

On the other hand, in the seat structure according to the embodiment of the present invention "spring constant variable: front and rear torsion bars", since a spring constant effected at a point near the resonance point is k/2 due to a serial connection of the front torsion bar 81 and the rear torsion bar 71, the damping ratio is raised and the vibration transmissibility at the resonance point is lowered compared with the seat structure provided with a torsion bar unit in the front of the seat (in FIG. 14, "spring constant fixed: front torsion bar"), showing an intermediate resonance characteristic between the resonance characteristics created by the front torsion bar and the rear torsion bar. Meanwhile, in a high frequency area, a characteristic of the front torsion bar 81 reacting sensitively holds a dominant position, and becomes nearly the same vibration absorbency as the seat structure provided with a torsion bar unit in the front of the seat (in FIG. 14, "spring constant fixed: front torsion bar"). In other words, the seat structure according to the embodiment of the present invention can maintain excellent vibration absorbency in a high frequency area of the structure provided with only a torsion bar unit in the front of the seat, and at the same time, the vibration transmissibility of the resonance point can be lowered, showing a most excellent vibration characteristic among the seat structures shown in FIG. 14.

Figure 15:
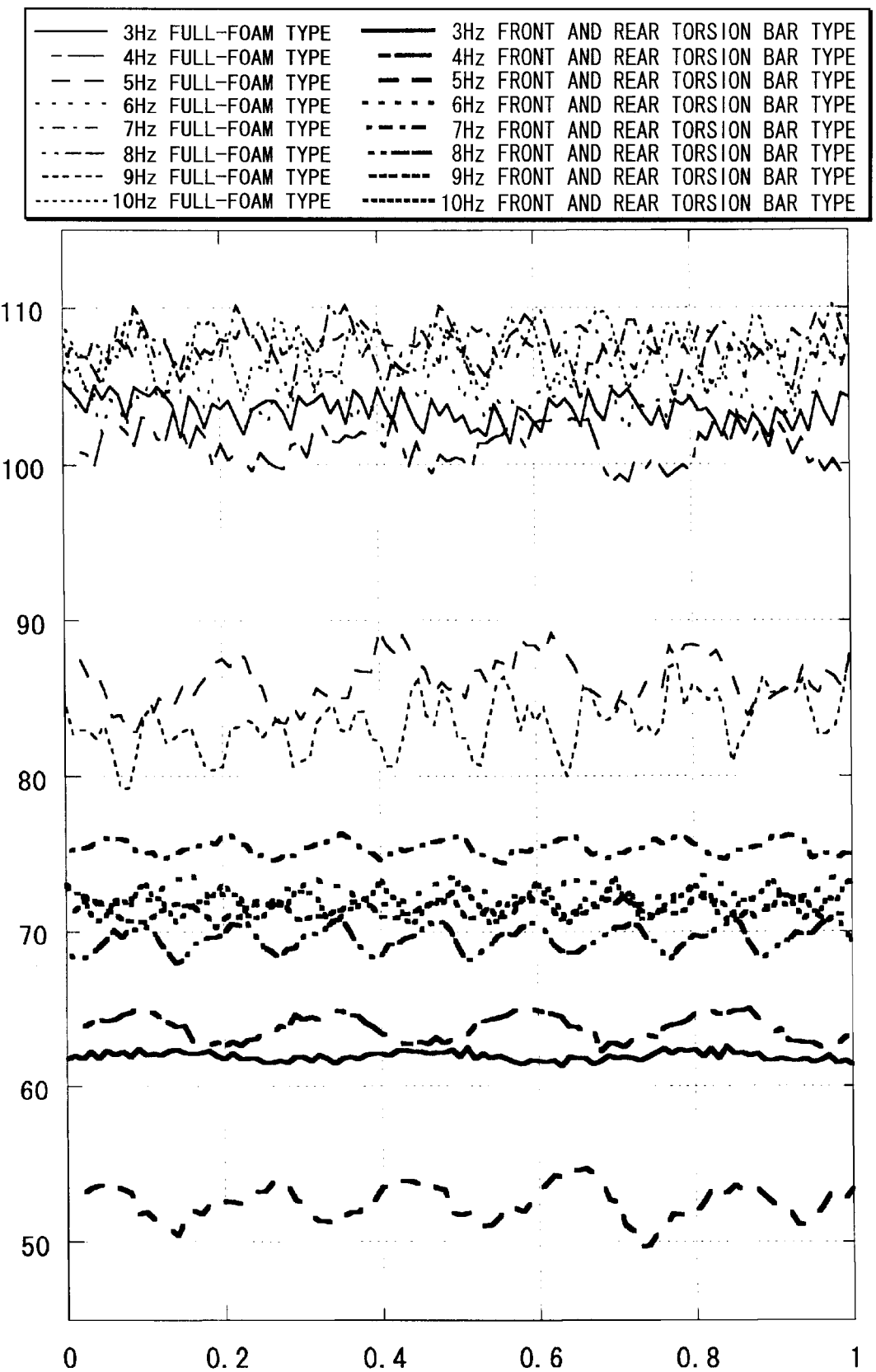
FIG. 15 is a view showing comparison data of pressure fluctuation beneath the ischium node of the cushioning member for a seat cushion under excitation at different excitation frequencies, every 1 Hz from 3 Hz to 10 Hz.
Figure 16:
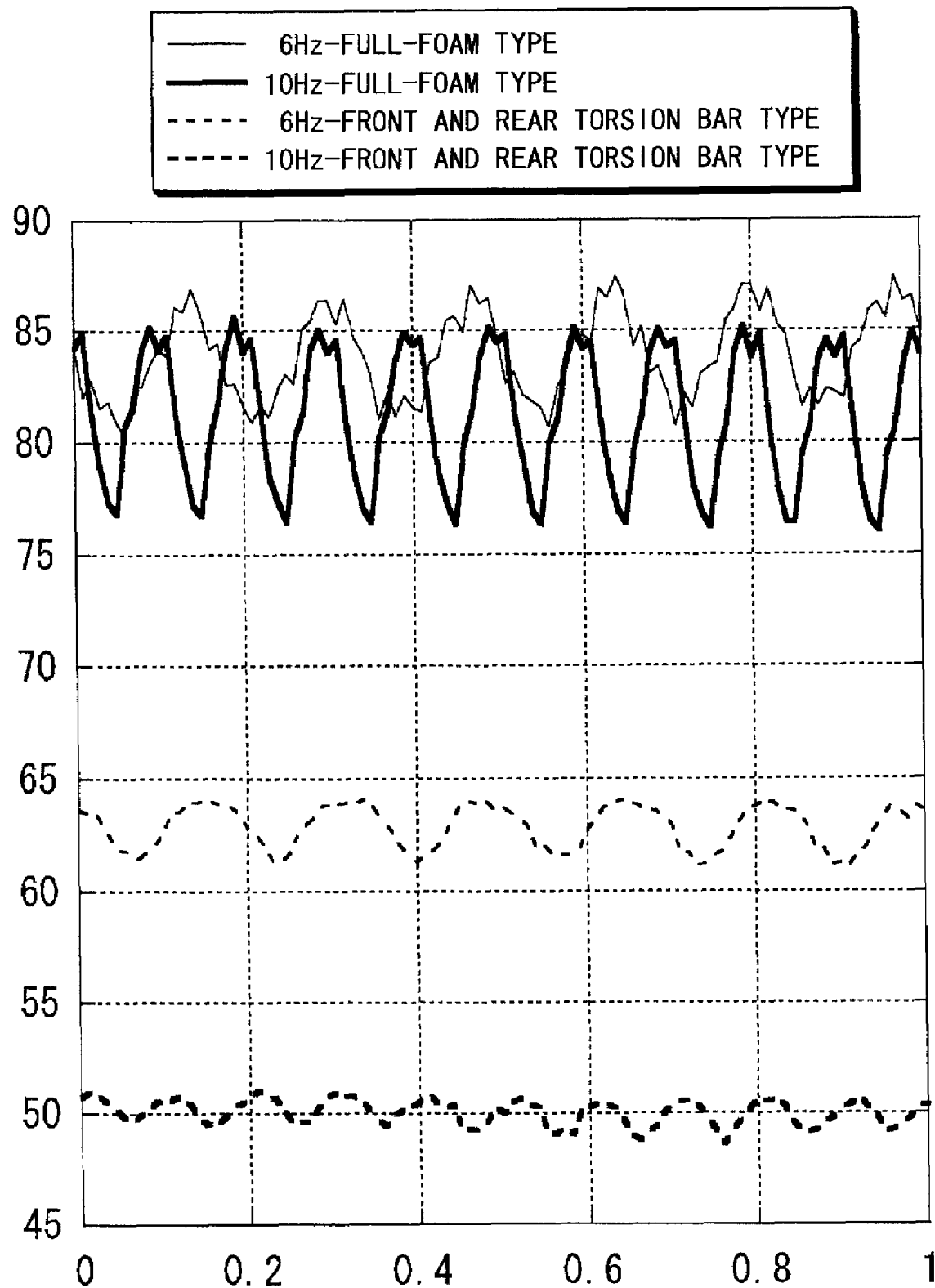
FIG. 16 is a view showing comparison data of pressure fluctuation of a cushioning member for a seat back at a portion corresponding to the third lumbar vertebra under excitation at 6 Hz and 10 Hz.

Next, respective pressure fluctuation at a point beneath the ischium node and the third lumber are compared for the seat structure of "spring constant variable: front and rear torsion bars" according to the embodiment of the present invention (in FIGS. 15 and 16, referred to as "front and rear torsion bar type") and for a conventionally well-known full-foam urethane (in FIGS. 15 and 16, referred to as "full-foam type"). The pressure fluctuation at the point beneath the ischium node is measured using a different excitation frequency every 1 Hz from 3 Hz to 10 Hz including 5 Hz near the resonance point, and the result is shown in FIG. 15. As for the pressure fluctuation of the third lumber vertebra, excitation at 6 Hz, which is a visceral resonance point, and 10 Hz, at which a backslap occurs, are compared and the result is shown in FIG. 16. Both results show pressure fluctuation values for 1 second.

From FIG. 15, it is found that the seat structure of "spring constant variable: front and rear torsion bars" according to the embodiment of the present invention fluctuates, for instant, in the range of 61 $g/cm^2$ to 62 $g/cm^2$ at 3 Hz, in the range of 62 $g/cm^2$ to 65 $g/cm^2$ at 4 Hz, in the range of 50 $g/cm^2$ to 54 $g/cm^2$ at 5 Hz, in the range of 74 $g/cm^2$ to 76 $g/cm^2$ at 7 Hz, in the range of 68 $g/cm^2$ to 71 $g/cm^2$ at 8 Hz. Whereas, the seat structure of the conventional well-known full-foam urethane fluctuates, for example, in the range of 101 $g/cm^2$ to 105 $g/cm^2$ at 3 Hz, in the range of 99 $g/cm^2$ to 103 $g/cm^2$ at 4 Hz, in the range of 83 $g/cm^2$ to 89 $g/cm^2$ at 5 Hz, in the range of 106 $g/cm^2$ to 109 $g/cm^2$ at 7 Hz, in the range of 105 $g/cm^2$ to 110 $g/cm^2$ at 8 Hz. In other words, in the case of the conventional well-known full-foam urethane, the fluctuation in the range of 80 $g/cm^2$ to 90 $g/cm^2$ at 9 Hz and 5 Hz in the vicinity of the resonance point shows the lowest, and at other frequencies, the pressure fluctuation shows a high value of about 100 $g/cm^2$ or more both at a low frequency and at a high frequency, while in the case of the seat structure according to the embodiment of the present invention no data exceeding 80 $g/cm^2$ at all measured frequencies from a low frequency to a high frequency were found, and the seat structure according to the embodiment of the present invention shows a much lower pressure value than the seat structure made of full-foam urethane. Furthermore, the width of fluctuation is small, corners of the waveform are rounded off, and noise components at a high frequency decrease drastically on the side of the seat structure according to the embodiment of the present invention. In other words, the waveform is converted to a sine wave having a substantially fixed circle, and a surface of a road surface is well perceived. This is due to difference in mass among systems beneath the spring including the cushioning member for a seat cushion (cushioning member of the present invention and frames supporting the cushioning member are lighter than full-foam urethane and frames necessary for supporting the full-foam urethane), and it is found that since the pressure value is small, the width of pressure fluctuation is also small, and the corners of the waveform are rounded off even in the vicinity of the resonance point on the side of the seat structure according to the embodiment of the present invention. The vibration is not transmitted in such a way as to be perceived as unpleasant by a human, and the riding comfort is excellent. In addition, absolutely the same tendency is shown in the third lumber vertebra in FIG. 16, that is, in either at 6 Hz and 10 Hz, the pressure values were small, the widths of pressure fluctuation were also small, and the corners of the waveform were rounded off on the side of the seat structure according to the embodiment of the present invention. Accordingly, the seat structure according to the embodiment of the present invention provides excellent riding comfort compared with the seat structure of conventional urethane foam.

Next, a kinetic fatigue experiment was carried out by mounting the seat structure of "spring constant variable: front and rear torsion bars" according to the embodiment of the present invention and the seat structure of "full-foam urethane" on a platform of a vibrator. A testee is seated, and vibration is applied with a random wave including irregular vertical vibration gathered by actually driving a road. The testee was a healthy 29-year-old Japanese male without lumbago, 168 cm tall and 85 kg in weight. In addition, the degree of fatigue (comparison test example 1) accumulated in a state in which the same testee was seated on a business chair performing light-work such as operating the key-board or mouse of a computer, and the degree of fatigue degree (comparison test example 2) measured in a static seating state without vibration on a seat structure manufactured by Delta Tooling Co. Ltd., using a solid knitted fabric stretched across frames as cushioning members for a seat cushion and a seat back, with a relaxed posture with the back of the testee touching the surface of the cushioning member for a seat back, were compared. The comparison test example 1 shows a typical example of a state in which fatigue is easily accumulated, and the comparison test example 2 shows a typical example of a state in which fatigue is not easily accumulated. The result is shown in FIG. 17.

It should be noted that the fatigue degree (pulse wave muscle fatigue degree) is calculated by a means proposed in Japanese Patent Application No. 2003-363902 by the present applicant. This means is carried such that a finger tip volume pulse wave is measured with an optical finger tip pulse wave meter, a peak value of each cycle of the original waveform in the time-series data of obtained finger tip volume pulse wave is detected, and the difference between the peak value on the upper limit side and the peak value on the lower limit side for every predetermined time range is calculated from obtained each peak value. This difference is taken as a power value, the gradient of the power value to the time axis in a prescribed time range is determined by slide calculating this gradient prescribed times at a prescribed lap rate to the above-described predetermined time, an integral value is calculated by absolute processing the power value gradient, and the integral value is taken as the fatigue degree. Since this integral value is recognized to have correlation with sensor evaluation of fatigue, it is used as a pulse wave muscle fatigue degree.

Figure 17:
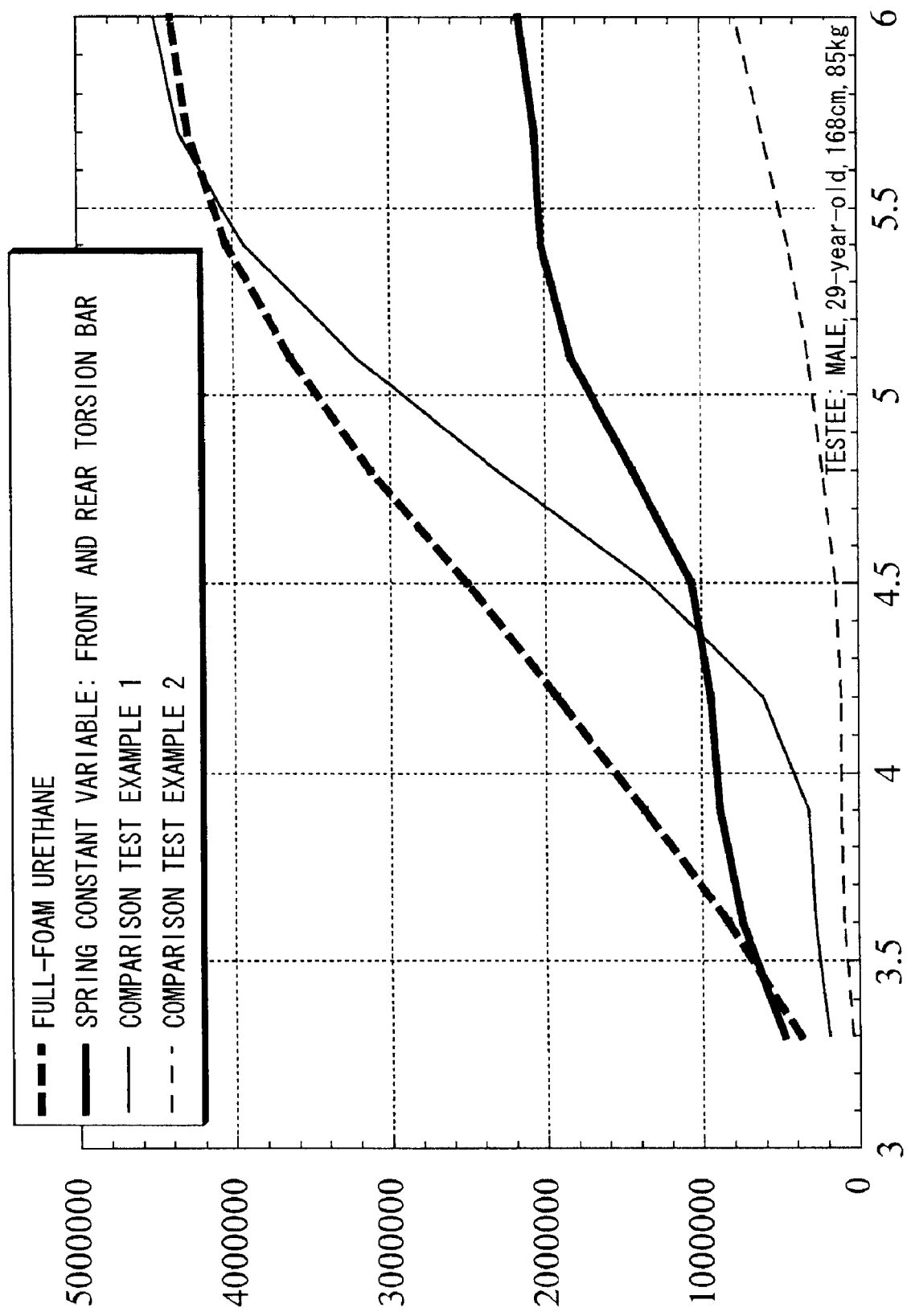
FIG. 17 is a graph showing the degree of a pulse wave muscle fatigue of a testee.

FIG. 17 clearly shows that the seat structure in a form of spring constant variable according to the embodiment of the present invention is more difficult to accumulate fatigue than the case of full-foam urethane. The case of full-foam urethane shows a tendency similar to the comparison test example 1 which is a typical example of easily accumulating fatigue, while the case of the spring constant variable seat structure according to the embodiment of the present invention shows a tendency similar to the comparison test example 2 which is a typical example of not easily accumulating fatigue, and in the case of full-foam urethane, fatigue proceeds at twice the rate of the spring constant variable seat structure according to the embodiment of the present invention.

Figure 18:
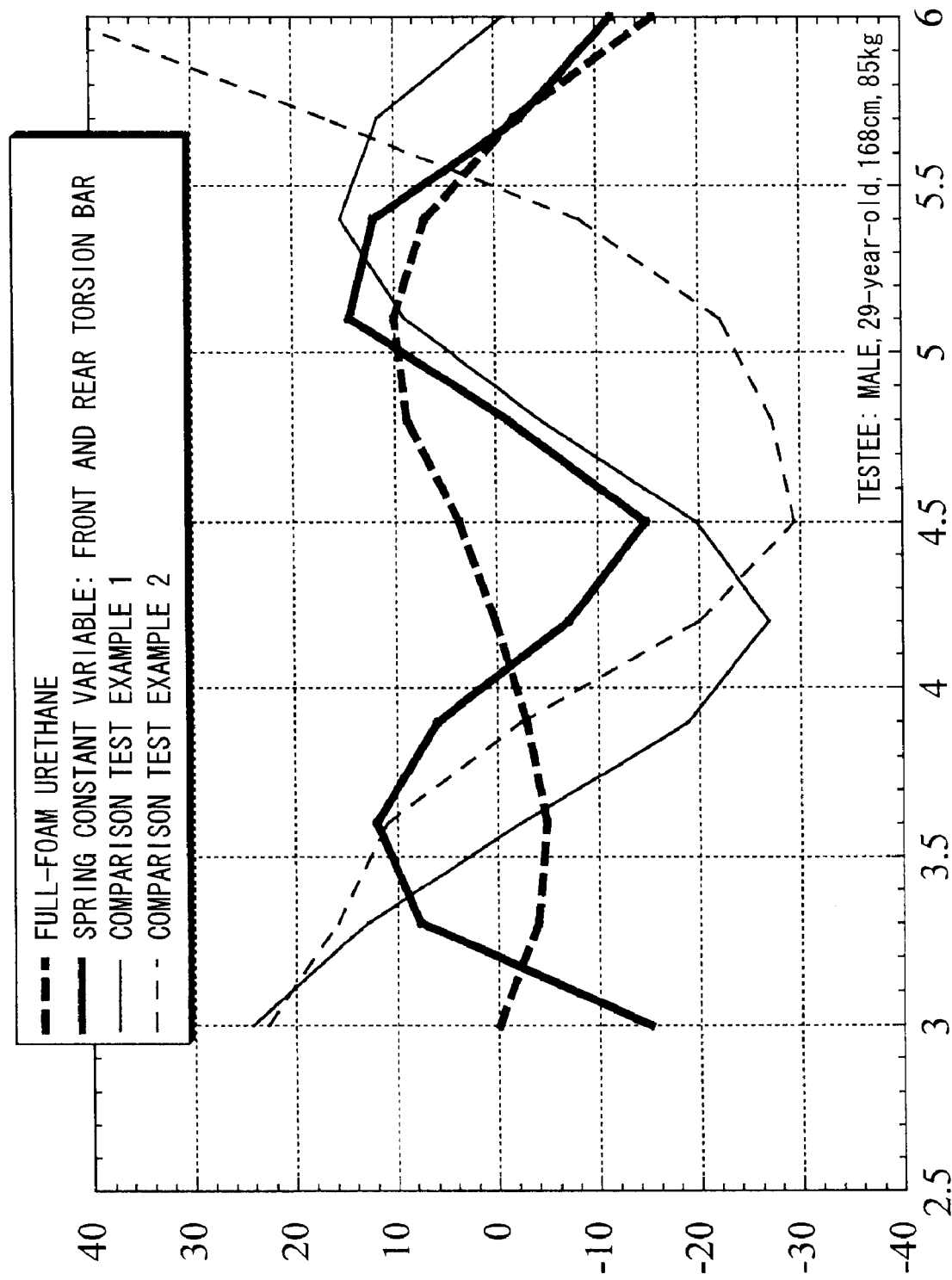
FIG. 18 is a graph showing fluctuation of degree of fatigue determined from a fatigue curve in FIG. 17.

FIG. 18 shows a view obtained by using a fatigue curve obtained from FIG. 17, and developing gradients of the fatigue curve on the time axis by a least-squares method. Quarrelling (variation) of homeostasis to return to an original state by canceling fatigue by means of a rest with a vibrator to always tick the same rhythm is quantified from fluctuation of a gradient curve (hereinafter, referred to as a variation curve) of this fatigue curve. It shows that the greater the fluctuation of the variation curve, the more likely to change conditions of mind and body in the direction to restore from the fatigue against the fatigue created while being seated on the seat, and it shows the smaller the fluctuation of the variation curve, the worse the correspondence of the conditions of mind and body to fatigue. (refer to "Development of Fatigue Degree Evaluation Method Using Variation of Finger Tip Volume Pulse Wave" Automobile Technical Association Spring Time Scientific Lecture Meeting (2005, May 18) (Naoki Ochiai, Etsunori Fujita, Yumi Ogura, Koji Murata, Tsutomu Kamei, Shigehiko Kaneko)).

As is clear from FIG. 18, it is found that the spring constant variable seat structure according to the embodiment of the present invention is, similarly to comparison test example 2 which is a typical example of not easily accumulating fatigue, a seat structure which has a greatly fluctuating variation curve, and is able to support a human in a state to easily allow the mind and body to cope with fatigue. Meanwhile, in the case of full-foam urethane, it is a seat structure which has a variation curve with little fluctuation, and is not easily operate human capability to cope with fatigue compared with the seat structure according to the embodiment of the present invention. In FIG. 18, it is found that fluctuation of the variation curve in the comparison test example 1, which easily accumulates fatigue as clearly shown in FIG. 17 is large. This is because since measurement is made in a static seating state without vibration in the comparison test example 1, the capability to cope with fatigue is seen to be high even when compared with the measurement result for the case of being seated on the seat structure according to the embodiment of the present invention. Also since the measurement is made while the testee is carrying out light-work which originally shows a high degree of fatigue, the accumulation rate of fatigue is far greater than the case of the seat structure according to the embodiment of the present invention. Whereas, in the case of the seat structure according to the embodiment of the present invention, though vibration stimulus is inputted due to excitation, it is said that the fatigue accumulation rate is low, and the seat structure is able to handle high fatigue in a manner close to that of a static seating state.

Figure 19:
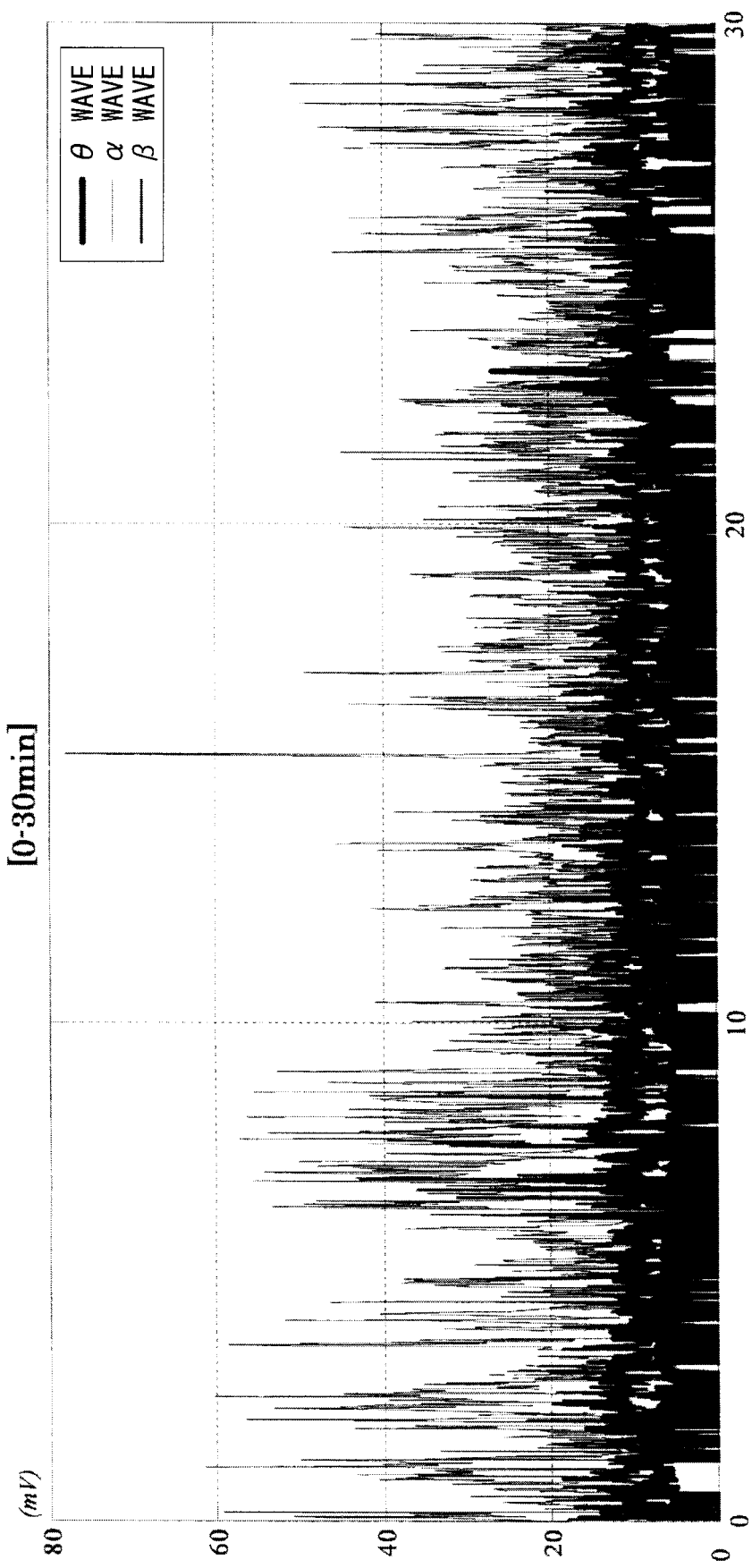
FIG. 19 is a brain wave of a testee seated on a seat structure having a variable spring constant according to an embodiment of the present invention, showing data from the start of measurement to a time 30 minutes later.
Figure 20:
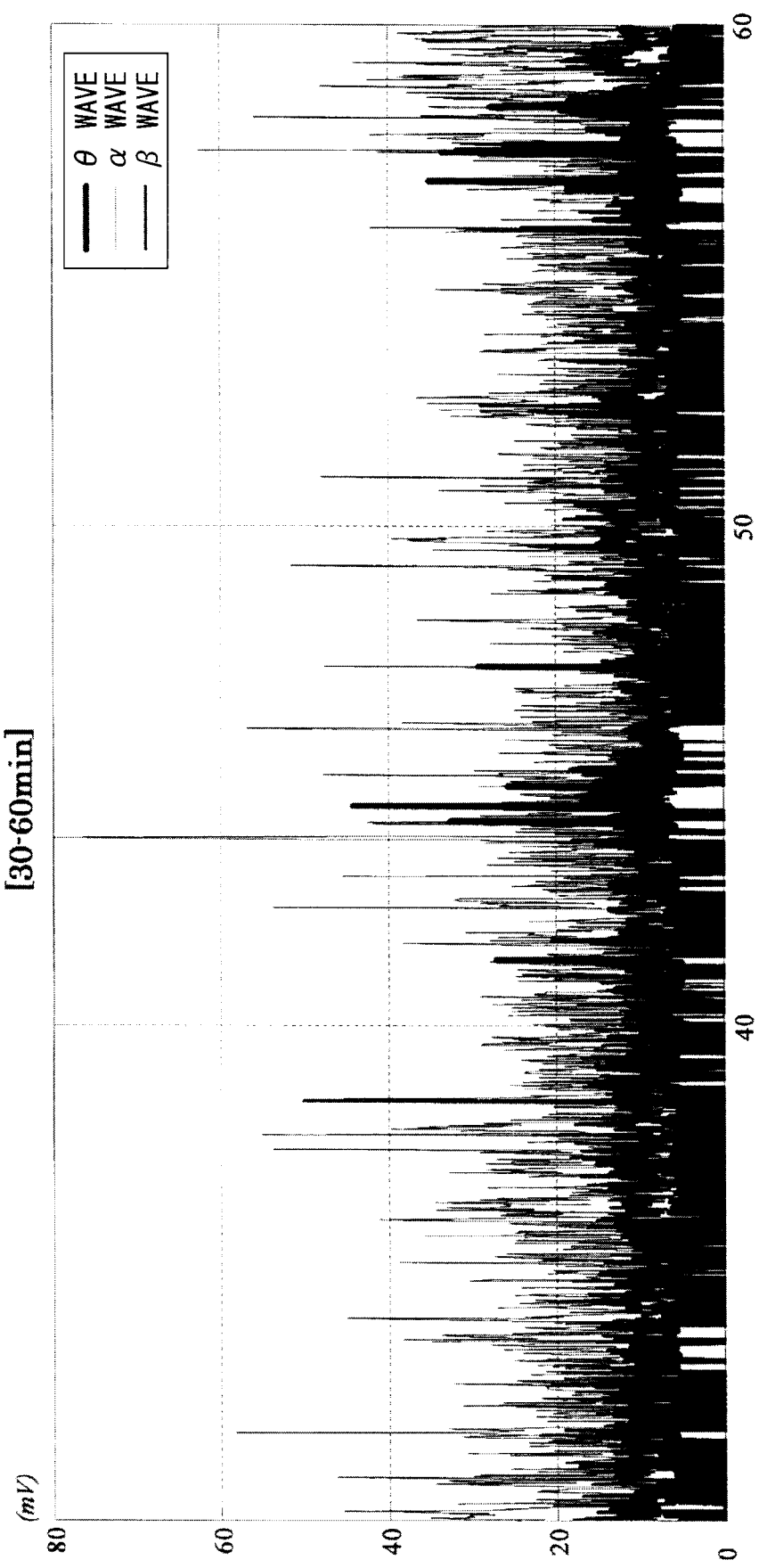
FIG. 20 is a graph showing data taken from 30 minutes to 60 minutes after the start of measurement, which is a continuation of the graph in FIG. 19.
Figure 21:
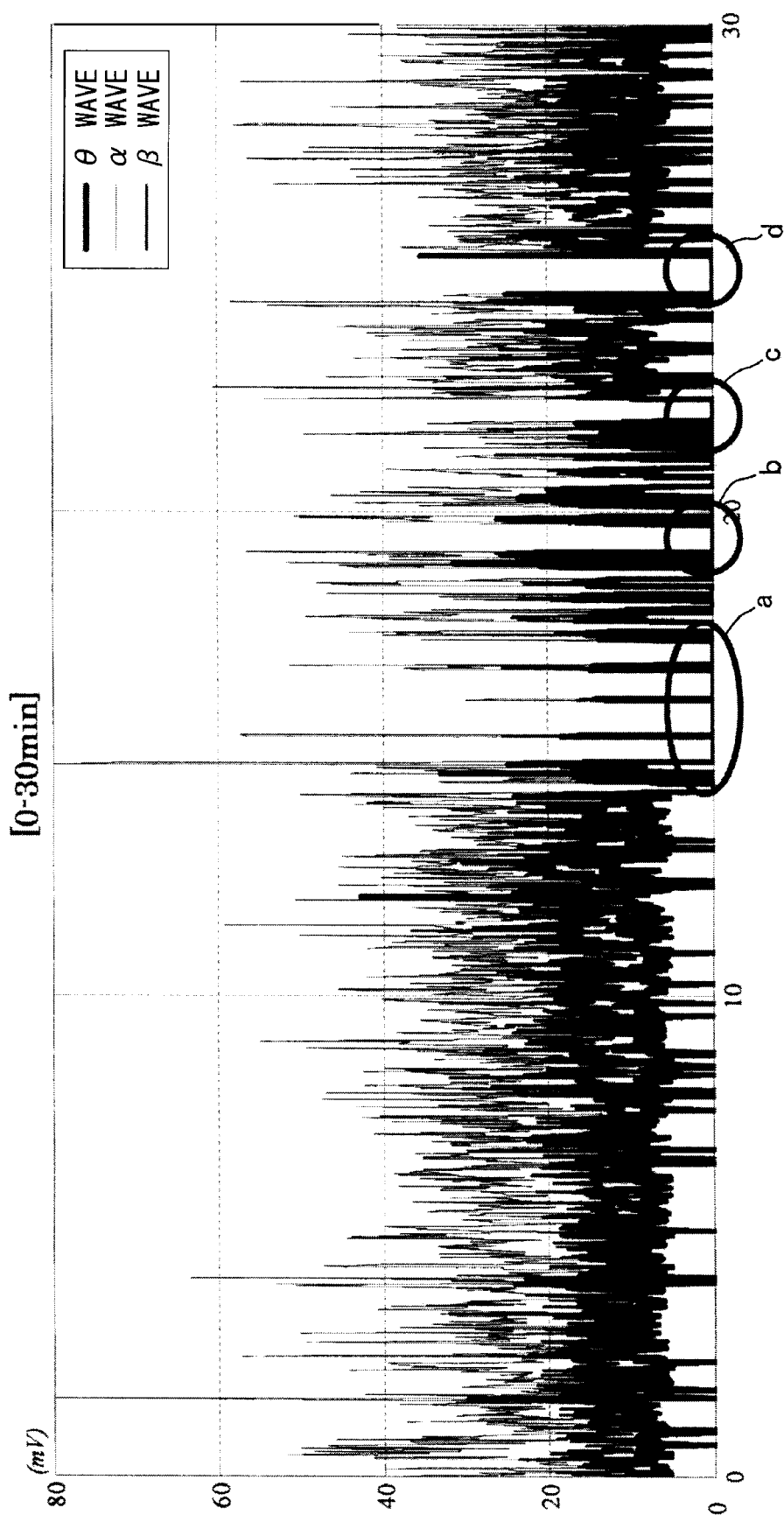
FIG. 21 is a brain wave of a testee seated on a seat structure having a well known full foam urethane, showing data from the start of measurement to a time 30 minutes later.

FIGS. 19 and 20 are data adopted by seating the above-described testee on the spring constant variable seat structure according to the embodiment of the present invention provided on a vibrator similarly to the above, and collecting a theta ($\theta$) wave, an alpha ($\alpha$) wave, and a beta ($\beta$) wave with a simplified electroence phalograph installed. FIG. 19 shows the measurement data from the start to 30 minutes later, and FIG. 20 shows from 30 minutes to 60 minutes after the start of the measurement. FIGS. 21 and 22 shows results of the similar experiment with the seat structure of full-foam urethane, and FIG. 21 shows measurement data from the start to 30 minutes later and FIG. 22 shows from 30 minutes to 60 minutes after the start of the measurement.

In the case of the seat structure of full-foam urethane shown in FIGS. 21 and 22, the distribution rate of the $\beta$ rhythm increases, and its fluctuation is large, which means that the testee shows a tendency to lose attentiveness. In contrast, the seat structure according to the embodiment of the present invention shown in FIGS. 19 and 20, the distribution rate of the $\beta$ rhythm is stable, its fluctuation is small, which shows the testee is seating in a relaxed state.

In the seat structure according to the embodiment of the present invention shown in FIGS. 19 and 20, any of the $\theta$ rhythm, $\alpha$ rhythm, and $\beta$ rhythm brain waves are gathered during any time period. Meanwhile, in FIGS. 21 and 22, as shown by symbols "a" to "j" in the drawings, there are certain time periods during which no brain wave is gathered. This is due to generation of a so-called artifact; in other words, myoelectricity due to muscle strain in the neck, shoulders, or the like works as a noise and the brain wave is buried in the noise so that the brain wave cannot be gathered. From this reason, it is said that a seat having a seat structure composed of full-foam urethane frequently uses muscular power to start body movement and easily creates a strain of the muscle, in other words, is a seat which easily creates fatigue. On the other hand, in the seat structure according to the embodiment of the present invention such an artifact cannot be seen and the testee is found to be able to sit in a more relaxed state.

According to the present invention, the structure includes the first torsion bar unit disposed in the rear of the seat as well as the second torsion bar unit disposed in the front of the seat, and a base net is stretched between a supporting frame of the first torsion bar unit and a supporting frame of the second torsion bar unit. Arms and the supporting frame of the second torsion bar unit positioned in the front of the seat pivot forward around the torsion bar acting as a fulcrum and since the direction of this movement coincides with the movement direction of the knee during pedal operation, a sense of stroke is enhanced at the time of seating, a sense of hitting at the front end of the seat during pedal operation or the like is reduced, and a sense of sitting, seating comfort are improved. Though a soft sitting sense is achieved by arrangement of the second torsion bar unit, similarly to the conventional manner, a load of a seated person is firmly received at a rather rigid and secure spring constant owing to the first torsion bar unit positioned in the rear of the seat so that a stable seating comfort can be obtained. Moreover, since both of the first torsion bar unit and second torsion bar unit work against vibration inputted during driving, a natural frequency is shifted toward the lower frequency side than the conventional art, and high vibration absorbency is obtained.

It is preferable for the first torsion bar unit in the rear of the seat to provide a torsion bar to be a fulcrum so as to position upper than a supporting frame supported via arms, and for the second torsion bar in the front of the seat to provide a torsion bar to be a fulcrum so as to position lower than a supporting frame supported via arms. It is preferable that a solid knitted fabric or the like composing a base net is passed through above the supporting frame of the second torsion bar unit and is engaged with an engaging bracket provided so as to protrude downward from the supporting frame, and is passed through the under side of the supporting frame of the first torsion bar unit to be engaged with an engaging bracket provided so as to protrude upward from the supporting frame. By structuring it like this, the supporting frame and the arms of the second torsion bar unit, in which a torsion bar being a fulcrum is positioned downward, displace more easily than the supporting frame and the arms of the first torsion bar unit in which the torsion bar being a fulcrum is positioned upward. More concretely, the following effect is achieved depending on the layout of the respective torsion bar units disposed in the front and rear of the seat and depending on the way of winding the base net to them. It means that difference in sensitivity to increase and decrease of the load occurs between the second torsion bar unit in which a torsion bar positions downward and the first torsion bar unit in which a torsion bar positions upward. That is, in the case of arrangement like the second torsion bar unit, since the base net displaces so as to wind around the supporting frame when a load (body weight) is applied, a horizontal component of the load is easy to work, and at the time of load fluctuation, the torsion bar and arms (supporting frame) of the second torsion bar unit are more easily displaced than elongation of the base net itself. This is resulted from that the spring constant of the base net tension is larger than that of the torsion bar. Whereas, in the first torsion bar unit, when a person is seated, an amount of downward fluctuation of the base net is large, the base net itself largely displaces as if in the direction to peel from the supporting frame. Therefore, downward displacement of the base net is relatively large compared with elongation of the base net itself. The load does not easily work as a horizontal component, and the torsion bar and the arms (supporting frame) of the first torsion bar unit are hard to displace.

Thus, the second torsion bar unit mainly works in the case of small load fluctuation. However, in the case of large load fluctuation, not only the second bar unit, but also the first torsion bar unit works additionally, and two torsion bars are disposed in series, so that the spring constant of ½ affects. In other words, the first torsion bar unit and the second torsion bar unit are connected such that transmission efficiency of force via the base net differs, and in the case of large displacement in the vicinity of resonance point, two torsion bars work together. At this time, since they work as a spring in series connection, a composite spring constant becomes smaller than the individual spring constant of the respective torsion bars. As a result, due to lowering of the natural frequency of the resonance point and loosening of the base net which is a tension structure, the damping ratio becomes large, the phase delay occurs, and the resonance peak is lowered. Accordingly, depending on the magnitude of input vibration, the spring constant varies from moment to moment according to whether the elastic force of either of the respective torsion bars of the first torsion bar unit and the second torsion bar unit mainly works or both torsion bars work. Therefore, the damping ratio continues to change. That is, since the spring constant becomes ½ at the resonance point, the damping ratio is $\sqrt{2}$ to lower the resonance peak. On the other hand, in the case of high frequency vibration, the spring constant k of the second torsion bar unit disposed in the front of the seat works and absorbs vibration owing to phase delay. This becomes a firmer and smaller damping spring action than the case of two torsion bar units working together. In the case of high frequency vibration, since the vibration is absorbed in a reverse phase, a small damping ratio is preferable. The reason why damping is small when only the second torsion bar unit mainly works is that in the vicinity of the front end of the base net engaged with the second torsion bar unit, the displacement direction of the arms and the supporting frame of the second torsion bar unit coincides with the movement direction of the knee, and therefore, elongation of the base net is small, and the elasticity of the torsion bar works effectively. This is because owing to a link mechanism of the leg via the joint, when vertical vibration is inputted to the buttocks or the leg, it is converted into vibration in front and behind.

What is claimed is:

1. A base net supporting mechanism for a seat cushion supporting a base net disposed under a cushioning member for the seat cushion, wherein the seat cushion is disposed across a seat frame, comprising:
   a first torsion bar unit including a torsion bar, arms connecting to the torsion bar, and a supporting frame supported by the arms, and said arms being provided at a rear of the seat cushion and being pivotal forward and rearward around the torsion bar acting as a fulcrum, wherein said first torsion bar unit is provided so that the torsion bar acting as a fulcrum is positioned above the supporting frame supported via the arm; and
   a second torsion bar unit including a torsion bar, arms connecting to the torsion bar, and a supporting frame supported by the arms, and said arms being provided at a front of the seat cushion and being pivotal forward and rearward around said torsion bar acting as a fulcrum, wherein
   the base net is stretched between the supporting frame of said first torsion bar unit and said supporting frame of the second torsion bar unit.

2. The base net supporting mechanism for a seat cushion according to claim 1, wherein said second torsion bar unit is provided so that the torsion bar acting as a fulcrum is positioned lower than the supporting frame supported via the arm.

3. The base net supporting mechanism for a seat cushion according to claim 2, wherein an engaging bracket protruding downward is attached to the supporting frame of said second torsion bar unit, a front end of said base net is wound around the supporting frame and a portion to be engaged provided at the front end is engaged with said engaging bracket.

4. The base net supporting mechanism for a seat cushion according to claim 1, wherein an engaging bracket protruding upward is attached to the supporting frame of said first torsion bar unit, a rear end of said base net is wound around the supporting frame, and a portion to be engaged provided in the rear end is engaged with said engaging bracket.

5. The base net supporting mechanism for a seat cushion according to claim 1, wherein the pivoting range of the arm in said second torsion bar unit is set at an angle of 40° around the torsion bar in both forward-tilting and rearward titling direction, respectively.

6. A seat structure having a cushioning member for a seat cushion wherein the seat cushion is disposed across a seat frame, and a base net disposed under the cushioning member for the seat cushion, comprising:
   a first torsion bar unit including a torsion bar, arms connecting to the torsion bar, and a supporting frame supported by the arms, and the arms being provided at a rear of the seat cushion being pivotal forward and rearward around the torsion bar acting as a fulcrum, wherein said first torsion bar unit is provided so that the torsion bar acting as a fulcrum is positioned above the supporting frame supported via the arm; and
   a second torsion bar unit including a torsion bar, arms connecting to the torsion bar, and a supporting frame supported by the arms, and said arms being provided at a front of the seat cushion and being pivotal forward and rearward around said torsion bar acting as a fulcrum, wherein
   the base net is stretched around the supporting frame of said first torsion bar unit and the supporting frame of said second torsion bar unit.

7. The seat structure according to claim 6, wherein said second torsion bar unit is provided so that the torsion bar acting as a fulcrum is positioned lower than the supporting frame supported via the arm.

8. The seat structure according to claim 7, wherein an engaging bracket protruding downward is attached to the supporting frame of said second torsion bar unit, a front end of said base net is wound around the supporting frame and a portion to be engaged provided in the front end is engaged with said engaging bracket.

9. The seat structure according to claim 6, wherein an engaging bracket protruding upward is attached to the supporting frame of said first torsion bar unit, a rear end of said base net is wound around the supporting frame and a portion to be engaged provided in the rear end is engaged with said engaging bracket.

10. The seat structure according to claim 6, wherein the pivoting range of the arm of said second torsion bar unit is set at an angle of 40° around the torsion bar in both forward-tilting and rearward titling direction, respectively.

11. The seat structure according to claim 6, wherein side frames of the seat frame are elastically deformed when a load equal to or greater than a predetermined limit is placed rearward on a seat back during impact, the supporting frame of said first torsion bar unit relatively displaces in a lower forward-tilting direction, lowering tension of the base net, and increasing a damping ratio.

12. The seat structure according to claim 11, wherein a stopper member controlling a pivoting range of the arm of said second torsion bar unit in a rearward-tilting direction is provided, and when the arm of the second torsion bar unit abuts on the stopper member after the tension of said base net is loosened during impact, the stopper member deforms or displaces moving a control position of the arm further rearward, to further lower the tension of said base net.

13. The seat structure according to claim 6, further comprising: an auxiliary elastic mechanism provided under said base net between said first torsion bar unit and the second torsion bar unit, to support a load together with the base net.

14. The seat structure according to claim 13, wherein said auxiliary elastic mechanism comprises an auxiliary net disposed under the base net, and a coil spring elastically supporting the auxiliary net to the side frames of the seat frame.

15. The seat structure according to claim 13, wherein said auxiliary elastic mechanism is formed including an air cushion disposed under the base net and having a plurality of partitioned bulging portions.

* * * * *